United States Patent
Ohsaki et al.

[11] Patent Number: 5,972,834
[45] Date of Patent: *Oct. 26, 1999

[54] CARBON ADSORBENT, MANUFACTURING METHOD THEREFOR, GAS SEPARATION METHOD AND DEVICE THEREFOR

[75] Inventors: Takushi Ohsaki; Takashi Inui; Katsuyoshi Yanagita; Masayoshi Hayashida; Nobuyasu Tomita; Fusao Nakamura; Satoshi Sawaguchi, all of Kitakoma-gun; Akira Wakaizumi, Kawasaki; Hiroyuki Miyake, Kitakoma-gun, all of Japan

[73] Assignee: Nippon Sanso Corporation, Tokyo, Japan

[ * ] Notice: This patent is subject to a terminal disclaimer.

[21] Appl. No.: 08/750,847
[22] PCT Filed: Apr. 26, 1996
[86] PCT No.: PCT/JP96/01152
   § 371 Date: Dec. 24, 1996
   § 102(e) Date: Dec. 24, 1996
[87] PCT Pub. No.: WO96/33801
   PCT Pub. Date: Oct. 31, 1996

[30] Foreign Application Priority Data

Apr. 27, 1995 [JP] Japan ........................... 7-10442
Mar. 5, 1996 [JP] Japan ........................... 8-47813

[51] Int. Cl.[6] ........................ B01J 20/02
[52] U.S. Cl. ............... 502/416; 423/219; 423/230; 423/239.1; 423/245.1; 502/430; 502/439
[58] Field of Search ................. 423/445 R, 460, 423/219, 230, 239.1, 245.1; 502/416, 430, 439; 95/96, 130, 138, 134, 143; 96/108

[56] References Cited

U.S. PATENT DOCUMENTS 2,944,627  7/1960  Skarstrom ................. 183/4.7
5,098,880  3/1992  Gaffney et al. ........................ 502/432
5,372,619  12/1994  Greinke et al. ........................ 502/416
5,461,023  10/1995  Chang et al. ........................ 502/437

FOREIGN PATENT DOCUMENTS 0 554 805   8/1993   European Pat. Off. .
52-18675   12/1972   Japan .
49-18555    5/1974   Japan .
49-25117    6/1974   Japan .
52-47758   12/1977   Japan .
53-44160   11/1978   Japan .

(List continued on next page.)

OTHER PUBLICATIONS

"New Version, Activated Carbons, Basis and Application", pp. 47–54, with English Abstract, No Date.
Carbon, vol. 30, No. 4, pp. 605–612, Jan. 1, 1992, S. N. Vyas, et al., "Carbon Molecular Sieves from Bituminous Coal by Controlled Coke Deposition".
Database WPI, Derwent Publications, AN–89–135599, JP–A–01 081 896, Mar. 28, 1989.

(List continued on next page.)

Primary Examiner—Steven Bos
Assistant Examiner—Stuart L. Hendrickson
Attorney, Agent, or Firm—Oblon, Spivak, McClelland, Maier & Neustadt, P.C.

[57] ABSTRACT

It is possible to increase the amount of nitrogen generated per unit of adsorbent, raise the nitrogen yield, and reduce the manufacturing cost for nitrogen by using, as an adsorbent for the separation of nitrogen, molecular sieving carbon obtained by successively conducting a halogenation treatment, a dehalogenation treatment, and a pore adjustment treatment on a carbonized charcoal. By using activated carbon obtained by successively conducting a halogenation treatment, a dehalogenation treatment, and an activation treatment on a carbonized charcoal, as an adsorbent for carbon dioxide and methane, it is possible to improve the amount adsorbed.

24 Claims, 8 Drawing Sheets

FOREIGN PATENT DOCUMENTS

| | | |
|---|---|---|
| 54-8200 | 4/1979 | Japan . |
| 58-39773 | 9/1983 | Japan . |
| 59-45914 | 3/1984 | Japan . |
| 59-64514 | 4/1984 | Japan . |
| 59-182215 | 10/1984 | Japan . |
| 60-171212 | 9/1985 | Japan . |
| 60-241931 | 11/1985 | Japan . |
| 62-108722 | 5/1987 | Japan . |
| 62-132543 | 6/1987 | Japan . |
| 62-176908 | 8/1987 | Japan . |
| 3-98641 | 4/1991 | Japan . |
| 4-200742 | 7/1992 | Japan . |
| 4-310209 | 11/1992 | Japan . |
| 4-338207 | 11/1992 | Japan . |
| 5-31361 | 2/1993 | Japan . |
| 5-285379 | 11/1993 | Japan . |
| 6-63397 | 3/1994 | Japan . |
| 6-100309 | 4/1994 | Japan . |
| 6-142503 | 5/1994 | Japan . |

OTHER PUBLICATIONS

Database WPI, Derwent Publications, AN–85–308555, SU–A–1 158 225, May 30, 1985.

"Adsorption Equilibria of Vapors and Gases on Microporous Adsorbents", K. Kawazoe, et al., pp. 513–516, Seisankenkyu, vol. 25, No. 11., (1973), No Month.

"Equilibria of Binary Gas Mixture Adsorption by Active Carbon", T. Yano, et al., pp. 654–664, (1961), Chemical Engineering, vol. 25, No. 9, No Month.

Kagaku Kogaku Kyokai (Chemical Engineering Handbook), Revised $5^{th}$ ed., Maruzen, pp. 589–590, published in Tokyo Mar. 18, 1988.

"Gas–Phase Adsorption Characteristics of High–Surface Area Carbons Activated Form Meso–Carbon Micro–Beads", T. Nitta, et al., Department of Chemical Engineering, Osaka University, Toyonaka, Osaka 560, pp. 176–182, Journal of Chemical Engineering of Japan, vol. 25, No. 2, (1992), No Month.

"Storage of Natural Gas By Adsorption on Activated Carbon", K. Matranga, et al., Chem. Eng. Sci., vol. 47, No. 7, pp. 1569–1579, (1992), No Month.

CARBON ADSORBENT, MANUFACTURING METHOD THEREFOR, GAS SEPARATION METHOD AND DEVICE THEREFOR

FIELD OF THE INVENTION

The present invention relates to the field of separation refining of industrial gas. In this type of field, for example, the manufacture of nitrogen gas by separating the oxygen and nitrogen of air; the manufacture of hydrogen gas by removing carbon dioxide, and the like from the decomposition gas of methanol; the manufacture of hydrogen gas by removing methane, and the like from coke oven gas; the manufacture of carbon dioxide by concentrating the carbon dioxide from the exhaust gas of combustion; and the like take place. This invention relates to a manufacturing method for a carbon adsorbent which comprises a molecular sieving carbon or an activated carbon which can be employed in gas separation such as those mentioned above; a pressure swing adsorption method for using these carbon adsorbents; and a separation device.

BACKGROUND OF THE INVENTION

Molecular sieving carbon and activated carbon are manufactured from carbon compounds obtained by the carbonization of carbon compounds such as coke, coal, wood charcoal, and coconut shell char; and all types of resin such as phenol resin, furan resin, and vinylidene chloride copolymer. In the present invention material obtained by the carbonization of carbon compounds is called carbonized charcoal.

Molecular sieving carbons (abbreviated as MSC, and also called carbon molecular sieves, abbreviated as CMS) are known as adsorbents for separating air into nitrogen and oxygen.

Molecular sieving carbons are adsorption-rate-dependent-separation adsorbents which use the fact that oxygen which has a small molecular diameter has a faster rate of adsorption than nitrogen.

Molecular sieving carbons are obtained by means of adjusting the size of the diameter of the pores in carbonaceous material (for example, activated carbon) by means of various methods.

Examples of the manufacturing methods for molecular sieving carbons which have been proposed up till now are described in Japanese Patent Application, Second Publication, No. Sho 52-18675; Japanese Patent Application, First Publication, No. Sho 59-64514; Japanese Patent Application, Second Publication, No. Sho 61-8004; Japanese Patent Application, First Publication, No. Sho 62-176908; Japanese Patent Application, First Publication, No. Sho 60-171212; the specification of U.S. Pat. No. 5,098,880; Japanese Patent Application, First Publication, No. Sho 62-176908; Japanese Patent Application, First Publication, No. Sho 62-132543; Japanese Patent Application, First Publication, No. Sho 62-108722; Japanese Patent Application, Second Publication, No. Sho 49-18555; Japanese Patent Application, Second Publication, No. Sho 61-8004; Japanese Patent Application, First Publication, No. Hei 4-310209, and so on.

Japanese Patent Application, Second Publication, No. Sho 52-18675 discloses a method in which hydrocarbons which discharge carbon by means of thermal decomposition are added to coke which contains a volatile component of up to 5%, and treated at 600~900° C. Japanese Patent Application, First Publication, No. Sho 60-171212 discloses a method in which the size of the pore diameter of activated carbon is adjusted by means of impregnating a commercially available carbon adsorbent with a thermally decomposable hydrocarbon. The specification of U.S. Pat. No. 5,098,880 discloses a method for adjusting the size of the pore diameter, wherein activated carbon in which two types of volatile hydrocarbon which have been divided into two portions are brought into contact with commercially available activated carbon starting material while heating.

As a conventional pressure swing adsorption method for separating air using a molecular sieving carbon, the specification of U.S. Pat. No. 2,944,627; Japanese Patent Application, Second Publication, No. Sho 53-44160; Japanese Patent Application, Second Publication, No. Sho 54-8200; and Japanese Patent Application, First Publication, No. Sho 59-182215 are known.

As methods for separating methane, carbon dioxide, and the like from a gas mixture, there are solution absorption methods, liquefied separation methods, and the like; however, pressure swing adsorption methods, called PSA (Pressure Swing Adsorption) methods, are more commonly used. Zeolite, activated carbon, and the like are used as adsorbents in pressure swing adsorption methods.

Japanese Patent Application, First Publication, No. Hei 3-98641 discloses that activated carbon which is superior in the adsorption of carbon dioxide can be obtained by means of treating carbonaceous material or activated carbon at approximately 600° C. or less in an activating atmosphere which contains oxygen and under conditions in which combustion does not take place.

Japanese Patent Application, First Publication, No. Hei 4-200742 states that the adsorption at low temperature of carbon dioxide by activated carbon which contains amine and water followed by discharge at high temperature is suitable.

Japanese Patent Application, Second Publication, No. Sho 52-47758 discloses that a carbonaceous material which adsorbs carbon dioxide but does not adsorb methane can be obtained by crushing carbonized saran waste, mixing it with a sintering agent like coal tar, then, mixing it with a granulating agent such as Avicel, granulating it, and carbonizing it at 400~900° C.

Japanese Patent Application, First Publication, No. Hei 6-100309 discloses that the difference in the equilibrium adsorption for methane and for carbon dioxide is large for a molecular sieving carbon obtained by putting a carbon substrate having an average micropore diameter of 5.5–12 Å into a treatment oven heated to 650~850° C., and conducting vapor deposition of thermally decomposed carbon on the micropores by supplying an inert gas which contains aromatic hydrocarbon and/or alicyclic hydrocarbon to the treatment oven.

As an example of the separation of carbon dioxide from a gas mixture by pressure swing adsorption methods using activated carbon, there are Japanese Patent Application, First Publication, No. Sho 60-241931, and Japanese Patent Application, First Publication, No. Hei 3-98641.

The following Examples give data for adsorption isotherms of carbon dioxide by activated carbon: Kawazoe et al., Seisankenkyu, 25, 11, page 513, 1973 [8.5 g/100 g=43 mlSTP/g (20° C., 1 atm)]; Yano et al., Kagaku Kogaku, 25, 9, page 654, 1961, [30 ccSTP/g (30° C., 1 atm)]; and Kagaku Kogaku Binran, page 589, 1992, [40 $cm^3$ NTP/g (37.7° C., 1 atm)].

In addition, the following examples give data for methane adsorption by activated carbon: Nitta et al., J. Chem. Eng.

Jpn, Vol. 25, No. 2, page 176, 1992 [1 mol/kg=22.4 mlSTP/g (25° C., 1 atm)]; Kimberly et al., Chem. Eng. Science, Vol. 47, No. 7, page 1569, [0.7~1.1 mmol/g=15.7~24.6 mlSTP/g (25° C., 1 atm)]; and Kagaku Kogaku Binran, page 589, 1992, [21 cm$^3$ NTP/g (37.7° C., 1 atm)].

For molecular sieving carbon manufactured by conventional methods, the adsorption capacity for oxygen and the coefficient of separation of oxygen and nitrogen were insufficient. For this reason, air separation by means of pressure swing adsorption required large amounts of molecular sieving carbon for each production unit of nitrogen gas. In addition, since the nitrogen yield was insufficient, the separation energy for each unit of nitrogen gas was high.

The separation of carbon dioxide, methane, and the like has become practicable by means of pressure swing adsorption methods which use activated carbon. However, its adsorption capacity is not able to sufficiently satisfy, and provision of activated carbon which is superior in adsorption efficiency of carbon dioxide, methane, and the like is strongly desired.

DISCLOSURE OF THE INVENTION

The present invention, learning from the above circumstances, aims to provide a molecular sieving carbon which is superior in that the amount of nitrogen adsorbed is large, and in its ability to separate oxygen and nitrogen; and a manufacturing method therefor. It also aims to provide activated carbon which is superior in its ability to adsorb carbon dioxide and methane, and a manufacturing method therefor. In addition, the present invention aims to provide a method for pressure swing adsorption using the above-mentioned molecular sieving carbon, and activated carbon as adsorbents; and a device therefor.

A first aspect of the present invention is a manufacturing method for a carbon adsorbent characterized by a halogenation treatment step in which a halogenated carbonized charcoal is obtained by bringing carbonized charcoal into contact with halogen gas; a dehalogenation treatment step in which a porous carbonaceous material is obtained by eliminating a part or all of the halogen in the above-mentioned halogenated carbonized charcoal; and a pore adjustment treatment step in which the above-mentioned porous carbonaceous material is brought into contact with thermally decomposable hydrocarbon.

A second aspect of the present invention is a manufacturing method for a carbon adsorbent characterized by a halogenation treatment step in which a halogenated carbonized charcoal is obtained by bringing carbonized charcoal into contact with halogen gas; a dehalogenation treatment step in which a porous carbonaceous material is obtained by eliminating a part or all of the halogen in the above-mentioned halogenated carbonized charcoal; and an activation treatment step in which the above-mentioned porous carbonaceous material is activated.

In the above-mentioned first and second aspects, the above-mentioned halogen gas can include at least one halogen selected from the group comprising chlorine and bromine.

In addition, in the above-mentioned first and second aspects, the above-mentioned halogenation treatment can be a heat treatment at a temperature of 350~1000° C. in a halogen gas diluted with inert gas.

In addition, in the above-mentioned first and second aspects, the above-mentioned dehalogenation treatment can provide a heat treatment at a temperature of 600~1300° C. in an inert gas, and a heat treatment at a temperature of 600~850° C. in a hydrogen compound gas which has been diluted with an inert gas. The above-mentioned hydrogen compound gas can include at least one compound selected from the group comprising water (steam) and lower hydrocarbon.

In addition, in the above-mentioned first and second aspects, the above-mentioned carbonized charcoal can be at least one carbonized carbon compound selected from the group comprising coconut shell char and phenol resin.

In the above-mentioned first aspect, the above-mentioned pore adjustment treatment can be a heat treatment at a temperature of 600~850° C. in a thermally decomposable hydrocarbon diluted with an inert gas. The above-mentioned thermally decomposable hydrocarbon can include at least one compound selected from the group comprising benzene and toluene.

In the above-mentioned second aspect, the above-mentioned activation treatment can be a heat treatment at 650~1150° C. in an oxidizing gas diluted with an inert gas.

A third aspect of the present invention is a carbon adsorbent obtained by the manufacturing method of the first aspect; the adsorbent being characterized by, at 25° C. and 1 atm, adsorbing oxygen in an amount of 9~14 cc/g, and having a separation coefficient for oxygen and nitrogen of 40~80.

A fourth aspect of the present invention is a carbon adsorbent characterized by adsorbing carbon dioxide in an amount of 70~100 cc/g at 25° C. and 1 atm, and by adsorbing methane in an amount of 30~45 cc/g at 25° C. and 1 atm.

In the above-mentioned fourth aspect, the above-mentioned carbon adsorbent is able to have a specific surface area of 400~2000 m$^2$/g, and a pore volume of 0.1~0.7 cm$^3$/g.

A fifth aspect of the present invention is a gas adsorption separation method characterized by having a step of supplying a mixed gas starting material to an adsorption column which has been charged with the carbon adsorbent of the above-mentioned third or fourth aspect; and a step of adsorption separation of a component gas of the gas mixture starting material by means of the above-mentioned adsorbent.

In said fifth aspect, as the above-mentioned gas mixture starting material, a gas mixture which contains at least one type of component gas selected from the group comprising carbon dioxide and methane is used, and said component gas can be adsorption separated by means of a pressure swing adsorption method.

A sixth aspect of the present invention is a method which separates nitrogen gas from air comprising the use of the carbon adsorbent of the above-mentioned third aspect when separating nitrogen from air by means of a pressure swing adsorption method.

A seventh aspect of the present invention is a gas adsorption device characterized by having an adsorption column provided with a gas supply part which is connected to a supply means for a mixed gas starting material, and an exhaust part for guiding the unadsorbed gas; said adsorption column being charged with an adsorbent which adsorption separates a part of a component gas of a gas mixture starting material; wherein said adsorbent is a carbon adsorbent of the above-mentioned third or fourth aspect.

BEST MODE FOR CARRYING OUT THE INVENTION

In the following description, the explanation is made using chlorine gas as the main example of the halogen gas used in the halogenation treatment; however, using the same technical concept, other halogen gases such as bromine can be used.

Figure 1:
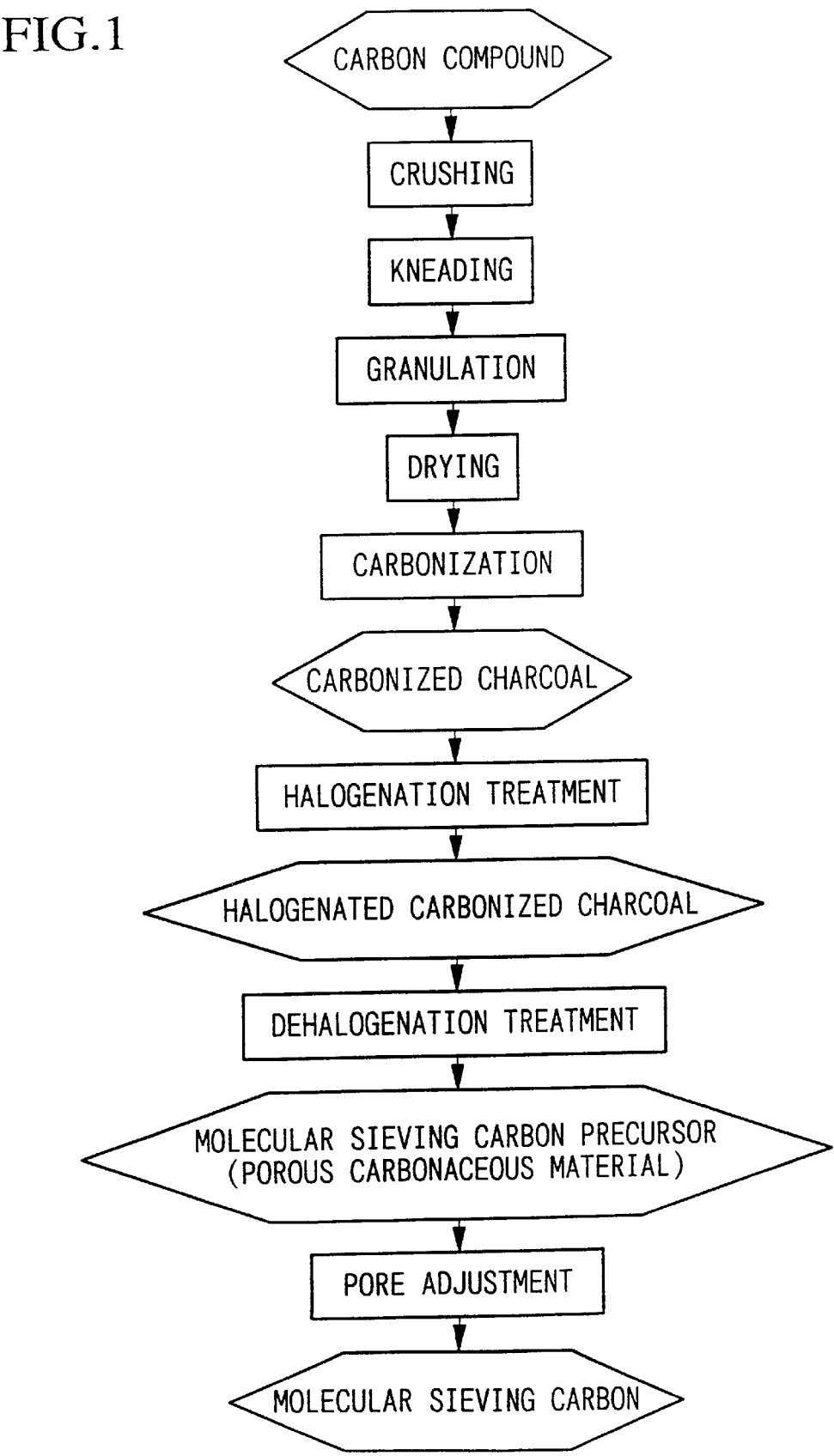
FIG. 1 is a manufacturing process diagram for a molecular sieving carbon of the present invention.

In a manufacturing method for a carbon adsorbent (molecular sieving carbon) which is one mode of the present invention, a halogen treatment is conducted on carbonized charcoal, and a pore adjustment treatment is conducted on the obtained porous carbonaceous material, used as a molecular sieving carbon precursor, by bringing it into contact with a thermally decomposable hydrocarbon. The manufacturing processes for the molecular sieving carbon of the present invention are shown in FIG. 1.

Figure 2:
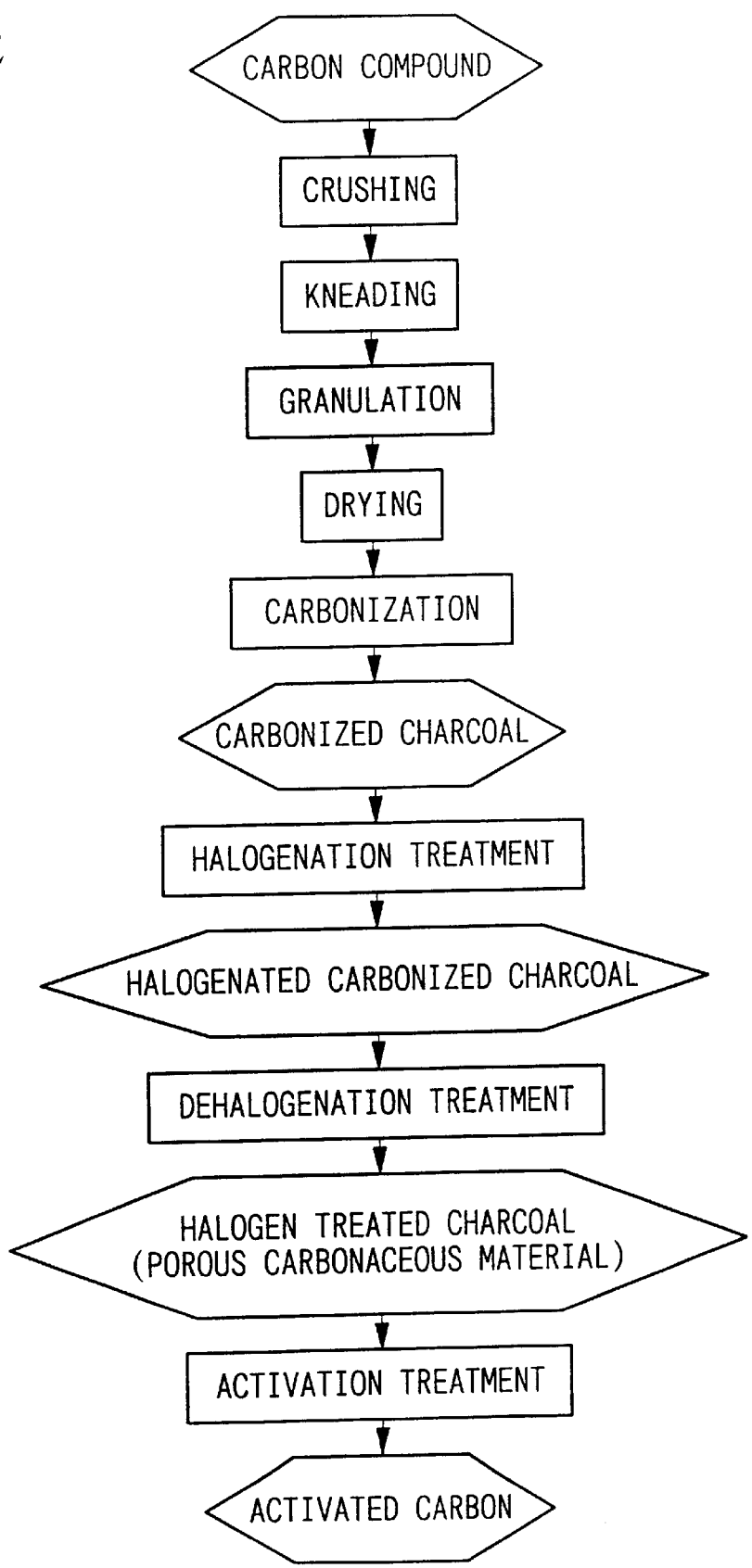
FIG. 2 is a manufacturing process diagram for an activated carbon of the present invention.

In a manufacturing method for carbon adsorbent (activated carbon) which is another mode of the present invention, a halogen treatment is conducted on carbonized charcoal, and an activation treatment is conducted on the obtained porous carbonaceous material by bringing it into contact with an oxidizing gas. The manufacturing processes for an activated carbon of the present invention are shown in FIG. 2.

The halogen treatment of the present invention comprises a halogenation treatment in which halogenated carbonized charcoal is obtained by bringing carbonized charcoal into contact with halogen gas; and thereafter, a dehalogenation treatment in which a part or all of the halogen of the halogenated carbonized charcoal is eliminated.

Using chlorine as an example, the degree of chlorination of chlorinated carbonized charcoal is expressed by the atomic ratio of chlorine to carbon (Cl/C). This atomic ratio is calculated by dividing the number of chlorine atoms by the number of carbon atoms, wherein the number of carbon atoms is calculated by taking the weight of carbonized charcoal before the chlorination treatment to be the weight of carbon, and the number of chlorine atoms is calculated by taking the weight increase due to the chlorination treatment to be the weight of chlorine. In addition, the degree of dechlorination is expressed by the atomic ratio of the chlorine which remains after the dechlorination treatment to the carbon. This atomic ratio is calculated by taking the weight decrease due to the dechlorination treatment to be the decrease in chlorine, converting this to number of atoms, subtracting this value from the number of chlorine atoms of the chlorinated carbonized charcoal, and dividing this value by the number of carbon atoms before the chlorination treatment.

When bromine is used as the halogen gas, the atomic ratio (Br/C) is also calculated in the same way as for chlorine mentioned above.

The atomic ratio of halogen to carbon defined in this way can be a negative value due to carbonizing or activating effects (the gasification of carbon).

Halogenation Treatment

In the embodiment, the chlorination treatment is a treatment in which carbonized charcoal is heated in chlorine gas which has been diluted with an inert gas, such as nitrogen, at a temperature of 350~1000° C., preferably 400~700° C., and more preferably at 500~700° C.

When the temperature of the heat treatment of the chlorination treatment exceeds 1000° C., due to the reduction in the quantity of hydrogen atoms as the carbonization progresses, the degree of chlorination (Cl/C) is reduced, and this is not desirable. In addition, when the temperature of the heat treatment of the chlorination treatment is less than 350° C., because the reaction speed of the unorganized carbon and the chlorine is too slow, a long period of time is required for the chlorination treatment, and this is not desirable.

With regard to the supply rate for the chlorine gas, when the concentration of the chlorine gas is 10% by volume, the superficial velocity in the column is of the level of 0.2~0.3L/(min·cm$^2$). The time for the chlorination treatment is about 30 minutes when in the high temperature region of the above-mentioned temperature range; however, about 120 minutes are required when in the low temperature range close to 400° C. Moreover, L represents the volume of the gas at approximately atmospheric pressure and room temperature (this is the same hereinafter).

When a bromination treatment is conducted as the halogenation treatment, other than using bromine gas in place of chlorine gas, the treatment is conducted under the same conditions as above.

In the chlorine treatment, in the main, since hydrogen atoms in the carbonized charcoal are replaced by chlorine atoms, hydrogen chloride (HCl) is detected in the exhaust gas. In the same way, in the bromination treatment, hydrogen bromide (HBr) is detected.

By means of the above-mentioned chlorination treatment, a chlorinated carbonized charcoal is obtained which has an atomic ratio of chlorine to carbon (Cl/C) of preferably 0.03 or greater, and more preferably of 0.07 or greater. Moreover, when this atomic ratio is less than 0.03, the contribution to the formation of the micropores is small, therefore this is not desirable.

In addition, the upper limit of the above-mentioned atomic ratio is determined by the carbonization temperature and the quantity of hydrogen atoms in the carbonized charcoal; however, it is understood that the desired results of the present invention can be obtained at 0.315 or less.

In the bromination treatment, even when the atomic ratio of bromine to carbon (Br/C) approaches 0.01, the effects of the present invention can be obtained.

Dehalogenation Treatment

In the best mode, the dehalogenation treatment is a treatment in which a high temperature dehalogenation and a low temperature dehalogenation are conducted successively.

When conducting the dehalogenation treatment, with regard to the degree of dechlorination, the above-mentioned atomic ratio (Cl/C) is preferably 0.02 or less, but it is not necessary for the chlorine to be completely eliminated. In addition, when conducting a debromination treatment, with regard to the degree of debromination, the atomic ratio (Br/C) is preferably 0.01 or less, but it is not necessary for the bromine to be completely eliminated.

During the dechlorination treatment, since the chlorine in the carbonized charcoal is eliminated mainly as hydrogen chloride, hydrogen chloride is detected in the exhaust gas. In the same way, during the debromination treatment, hydrogen bromide is detected.

The best high temperature dechlorination treatment is a heat treatment conducted under vacuum evacuation or in an inert gas at a temperature of 600~1300° C., preferably at 900~1100° C., and more preferably at 900~1000° C. With regard to the time for the heat treatment, by 20~30 minutes, the objective of dechlorination is generally achieved, however, in order to manufacture an oxygen/nitrogen adsorption-rate-dependent-separation molecular sieving carbon precursor approximately 60~150 minutes are preferable.

In the high temperature dechlorination treatment, the chlorine in the carbonized charcoal is not completely eliminated, and some part remains.

The degree of vacuum evacuation is not particularly limited, for example, it could be a pressure reduced atmosphere of 10 Torr.

The high temperature debromination treatment can also be conducted under the same conditions as the above-mentioned high temperature dechlorination treatment. After the high temperature debromination treatment, the bromine in the carbonized charcoal is not completely eliminated, and some part remains.

The best low temperature dechlorination treatment is a heat treatment at a temperature of 600~850° C., preferably 650~750° C., and more preferably at 675~725° C., in a hydrogen compound gas or in a hydrogen compound gas which has been diluted with an inert gas. A heat treatment time of 20~30 minutes is sufficient.

In the low temperature dechlorination treatment, the chlorine in the carbonized charcoal is almost completely eliminated.

Here, the hydrogen compound gas is steam ($H_2O$); hydrogen; lower hydrocarbons, such as methane ($CH_4$), ethane ($C_2H_6$), ethylene ($C_2H_4$), propane ($C_3H_8$), propylene ($C_3H_6$), butane ($C_4H_{10}$), and butylene ($C_4H_8$); and mixtures of these gases. As a hydrogen compound gas in an inert gas, the exhaust gas of LPG (liquid petroleum gas) which has been incompletely burned is suitable for industrial use. The composition of the above-mentioned exhaust gas is steam: 13~17% by volume; carbon dioxide: 9~12% by volume; carbon monoxide: 0.01~1% by volume; nitrogen: 68~74% by volume; and unburned lower hydrocarbons: 0.01~3% by volume.

When the above-mentioned hydrogen compound is steam, the concentration of the steam is not particularly limited; however, when the superficial velocity in the column is from 0.05 to 0.15 L/(min·cm$^2$), 3% by volume is sufficient.

Furthermore, when the heat treatment occurs at a temperature of 850° C. or greater, the activation activity due to the steam progresses too far, and, in addition to reducing the carbon yield, the effects of the present invention are reduced.

When the above-mentioned hydrogen compound is a lower hydrocarbon such as methane, the concentration of the lower hydrocarbon is not particularly limited; however, when the gas column speed is 0.05~0.15 L/(min·cm$^2$), 20% by volume is sufficient.

Furthermore, when the above-mentioned hydrogen compound is a lower hydrocarbon, and the heat treatment occurs at a temperature exceeding 850° C., a carbon impregnation effect due to the thermal decomposition of the lower hydrocarbon is produced, and because the micropores are blocked, the effects of the present invention are reduced.

When the above-mentioned hydrogen compound is hydrogen, since there is no activation activity, there is no restriction on the above-mentioned upper limit.

When the above-mentioned hydrogen compound is either steam or a lower hydrocarbon, and the heat treatment occurs at a temperature of less than 600° C., the rate of the dechlorination is slow, and sufficient dechlorination can not take place.

The low temperature debromination treatment can also be conducted under the same conditions as the above-mentioned low temperature dechlorination treatment. In the low temperature dechlorination treatment, the bromine in the carbonized charcoal is almost completely eliminated.

There are five treatment methods for dehalogenation: methods in which only a high temperature dehalogenation treatment is conducted; methods in which only a low temperature dehalogenation treatment is conducted; methods which are combinations of these methods in which a high temperature dehalogenation treatment and a low temperature dehalogenation treatment are successively conducted; methods in which a low temperature dehalogenation treatment and a high temperature dehalogenation treatment are successively conducted; and methods in which a high temperature dehalogenation treatment, a low temperature dehalogenation treatment, and a high temperature dehalogenation treatment are successively conducted. These are shown in Table 1.

TABLE 1

Five Treatment Methods for Dehalogenation Treatment

| 1) High Temperature Dehalogenation Treatment: | heat treatment under vacuum evacuation or in inert gas | |
|---|---|---|
| 2) Low Temperature Dehalogenation Treatment: | heat treatment in hydrogen compound gas or in hydrogen compound gas diluted with inert gas | |
| 3) High Temperature Dehalogenation Treatment | → Low Temperature Dehalogenation Treatment | |
| 4) Low Temperature Dehalogenation Treatment | → High Temperature Dehalogenation Treatment | |
| 5) High Temperature Dehalogenation Treatment | → Low Temperature Dehalogenation Treatment | → High Temperature Dehalogenation Treatment |

Among the treatment methods for dehalogenation explained above, when a treatment in which a high temperature dehalogenation treatment and a low temperature dehalogenation treatment are successively conducted is adopted using a hydrogen compound, steam, or a mixture of steam and a lower hydrocarbon, the effects of the present invention become even more apparent.

The porous carbonaceous material obtained by means of the above-mentioned halogen treatment can produce a molecular sieving carbon precursor for which the amount of oxygen and nitrogen adsorbed at 1 atm and 25° C. is 12.5~20 cc/g, and this is a 15~50% increase compared with that of the conventional carbonaceous material.

Pore Adjustment Treatment

The pore adjustment treatment is conducted in order to adjust the pore diameter of the molecular sieving carbon precursor, and by appropriate selection of the type of thermally decomposable hydrocarbon, the treatment temperature and the time of the treatment, it is possible to make the pore diameter the desired size. By means of this, in accordance with the size of the molecular diameter of the adsorption gas, it is possible to control the adsorption rate.

The pore adjustment treatment of the present invention can be a heat treatment in which the molecular sieving carbon precursor obtained by means of the halogen treatment is heat-treated at a temperature of 600~850° C., and preferably at 700~750° C., and preferably in thermally decomposable hydrocarbon which has been diluted with inert gas. When 850° C. is exceeded, the thermally decomposed carbon becomes impregnated in the micropores, and since the amount which can be adsorbed is reduced, this is not desirable. When less than 600° C., the rate of thermal decomposition is slow, and since a long period of time is necessary for the pore adjustment, this is not desirable.

In the manufacturing method for the molecular sieving carbon of the present invention, benzene or toluene can be suitably used for the thermally decomposable hydrocarbon gas for adjusting the pores of the molecular sieving carbon precursor obtained by means of the halogen treatment.

The manufacturing method for the molecular sieving carbon of the present invention can be applied to various types of carbonized charcoal, but, in particular, carbonized charcoal obtained by carbonizing coconut shell char or phenol resin is preferable as a starting material.

For the molecular sieving carbon obtained by the above manufacturing method, the amount of oxygen adsorbed at 1 atm and 250° C. is 9~14 cc/g, and, moreover, the coefficient of separation for oxygen and nitrogen is 40 to 80.

Separation Coefficient

The separation coefficient (K) is derived from the adsorption rate equation shown below, and expresses the separation efficiency of adsorption-rate-dependent-separation adsorbents.

$$dq/dt = k(q^* - q)$$

Here, $q^*$ is the equilibrium adsorption amount, q is the adsorption amount which occurs in time t, and k is the adsorption rate constant. Separation coefficient K is derived as in the following formula as a ratio of the adsorption rate constant.

$$K = k_A/k_B = \ln(1 - q_{Ar})/\ln(1 - q_{Br})$$

$$q_r = q/q^*$$

Here, the subscript letters A and B express types of gas (material to be adsorbed). In the present invention, the amount of adsorption which occurs in the time domain of qr<<1 of the first stage of adsorption is approximately proportional to the time, and can be calculated using the following simple equation.

$$q_A = at, \quad q_B = bt$$

$$K \approx q_A/q_B = a/b = t_A/t_B$$

Here, a and b are proportional constants, $t_A$ and $t_B$ are times which satisfy $q_A(t_A) = q_B(t_B)$.

Manufacture of Activated Carbon

FIG. 2 shows the manufacturing processes for the activated carbon according to the present invention. That is, the activated carbon of the present invention can be manufactured by successively conducting a halogenation treatment, a dehalogenation treatment, and an activation treatment on a carbonized charcoal.

The manufacturing method for the activated carbon of the present invention can be applied to carbonized charcoal obtained using various carbon compounds as starting materials, but carbonized coconut shell char or carbonized phenol resin are preferable.

Activation Treatment

The activation treatment is, for example, a treatment which develops porosity by means of contact with an oxidizing gas such as carbon dioxide gas, steam, and air. The activation treatment is a treatment in which activation occurs by heating at a temperature of 650~1150° C. in an oxidizing gas diluted with an inert gas.

In this activation treatment, the activation yield can be varied by adjusting the time of heating. The activation yield (%) is shown by (post-activation weight)÷(pre-activation weight)×100.

In addition, as the above-mentioned oxidizing gas, gases such as carbon dioxide, steam, and oxygen can be mentioned.

For example, in carbon dioxide activation, the temperature is 700 to 1150° C., and preferably 800 to 1000° C.; and the treatment time is 10 to 300 minutes, and preferably 30 to 180 minutes. The activation yield is preferably 50 to 95%.

In addition, in steam activation, the temperature is 650 to 1100° C., and preferably 700 to 1000° C.; and the treatment time is 10 to 300 minutes, and preferably 30 to 180 minutes. The activation yield is preferably 50 to 95%.

The activated carbon of the present invention, manufactured by the above method, can have a specific surface area of 400 to 2000 m$^2$/g, and a pore volume of 0.1 to 0.7 cm$^3$/g. This activated carbon adsorbs carbon dioxide in an amount of 70 to 100 cm$^3$/g at 25° C. and 1 atm. In addition, it adsorbs methane in an amount of 30 to 45 cm$^3$/g, and this is approximately a 35 to 100% increase compared with that of conventional activated carbon.

The adsorption characteristics for carbon dioxide, methane, and the like can be adjusted by changing any of the conditions of the starting material, the carbonization, the halogen treatment, and the activation.

Pre-Halogenation Treatment Steps

Outlines of the manufacturing processes for the molecular sieving carbon and the activated carbon are shown in FIG. 1 and FIG. 2, but an outline of the steps, common to both, which are conducted prior to the halogenation treatment are as follows.

From among the carbon compounds, when using phenol resin as the starting material, the phenol resin is first allowed to harden, and then it is crushed.

Crushing: the carbon compound (hardened resin) is finely crushed, using, for example, a ball mill, in such a way that the average particle diameter is from several μm to tens of μm, with the goal being that the treatments that follow crushing be uniform.

Kneading: for the purpose of granulation which is the next step, a binder, which is, for example, one of coal tar, creosote, phenol resin, and the like, or a mixture of a number of these, is added to the crushed carbon compound which is then kneaded.

Granulation: the above-mentioned kneaded material (the mixture of the crushed carbon compound and the binder) are granulated into small cylinders (pellets) using, for example, a disk pelletor.

Drying: the manufactured granules are heat-treated at a temperature of 140 to 200° C., and preferably 160° C., thereby increasing the strength of the granule products and removing the low boiling temperature volatile component contained in the binding, with the aim of suitably conducting the following carbonization.

Carbonization: the above-mentioned dried product is heated at a temperature 550 to 1000° C., and preferably at 600° C., under an atmosphere of, for example, inert gas, and this is a treatment which mainly removes the volatile component contained in the binder.

Pressure Swing Adsorption

Another mode of the present invention is a method for separating nitrogen from air by means of pressure swing adsorption, wherein the adsorbent employed is a molecular sieving carbon obtained by conducting a pore adjustment treatment on a porous carbonaceous material obtained by means of a halogen treatment. In addition, there is a method for separating carbon dioxide or methane from gas which contains carbon dioxide or methane by means of pressure swing adsorption, wherein the adsorbent employed is an activated carbon obtained by conducting an activation treatment on a porous carbonaceous material obtained by means of a halogen treatment.

Yet another mode of the present invention is a device for separating nitrogen from air by means of pressure swing adsorption, wherein the adsorbent employed is a molecular sieving carbon obtained by conducting a pore adjustment treatment on a porous carbonaceous material obtained by means of a halogen treatment. In addition, there is a device for separating carbon dioxide or methane from gas which contains carbon dioxide or methane by means of pressure swing adsorption, wherein the adsorbent employed is an activated carbon obtained by conducting an activation treatment on a porous carbonaceous material obtained by means of a halogen treatment.

The molecular sieving carbon employed in the present invention, compared with conventional molecular sieving carbon, significantly improves the amount of oxygen adsorbed, and also improves the separation coefficient. For this reason, even for pressure swing adsorption methods and devices which are basically the same as conventional ones, it is possible to increase the amount of nitrogen generated per volume of adsorption column by 35 to 63%, and to increase the nitrogen yield by 10 to 24% by means of using the molecular sieving carbon of the present invention.

In addition, the activated carbon of the present invention significantly increases the amount of carbon dioxide and methane adsorbed compared with conventional activated carbon. For this reason, by using the activated carbon of the present invention in pressure swing adsorption methods and devices which are basically the same as conventional ones, gas adsorption efficiency can be improved, and the amount generated and the yield of the gas being separated can be improved.

In the following, the actions of the present invention are explained.

Molecular sieving carbon and activated carbon are classified as nongraphitizing carbon. Nongraphitizing carbon consists of microcrystalline carbon (called crystallite or six membered ring carbon net plane), unorganized carbon, and the like. In nongraphitizing carbon, the crystallites take on a structure which is layered in a disorderly manner, and a wide range of pores, from micropores to macropores, are formed in the gaps between these crystallites.

If the actions of the halogen treatment of the present invention are explained using a chlorine treatment as an example, then, in the chlorine treatment, the chlorine which is brought into contact with the carbonized charcoal reacts with the unorganized carbon. In these reactions, there are addition reactions of chlorine to double bonded carbons, exchange reactions of chlorine atoms for hydrogen atoms which are bonded to the unorganized carbon (hydrogen chloride in a molar equivalent to chlorine is generated), dehydrogenation reactions (hydrogen chloride twice that of the chlorine is generated), and so on.

In the dechlorination treatment, the chlorine which is bonded to the above-mentioned unorganized carbon is eliminated. It is believed that new bonds between carbons (hereinafter, carbon bonds) are formed by means of a reaction, shown in the following formula, which occurs in the chlorination treatment and the dechlorination treatment. The mark | located to the side of a C indicates that it is an unorganized carbon.

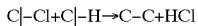

$$C|\text{-}Cl+C|\text{-}H \rightarrow C\text{-}C+HCl$$

Moreover, when bromine is brought into contact with carbonized charcoal, with the exception that bromine takes part in the reaction in place of chlorine, it is believed that carbon bonds are formed by means of a reaction the same as that mentioned above.

By means of the formation of these new carbon bonds, actions such as the action of repairing defects in the polyaromatic ring structure of the crystallites or the carbon net planes, the action of growth of the crystallites, and the action of changes in the aggregation condition of crystallites are believed to take place, but these details are unclear. However, by means of these actions, it is believed that a large number of micropores (0.8~2 nm) and/or sub-mircopores (<0.8 nm) are formed which are suitable for the adsorption of gases which have small molecular diameters such as oxygen and nitrogen.

For this reason, the molecular sieving carbon precursor of the present invention adsorbs oxygen and nitrogen in an amount 15~50% greater than conventional carbonaceous materials, and the rate of adsorption is extremely high. When a suitable pore adjustment is conducted on the precursor, it is possible to slow down the adsorption rate of nitrogen without much reduction in the adsorption rate and amount adsorbed for oxygen. A theory about the mechanism of pore adjustment has not been established but it is believed that the rate separating ability is manifested as a result of the narrowing of a part of the mesopores (20~50 nm), the sub-micropores, and the openings of the micropores by thermally decomposed carbon, which increases resistance at the time of adsorption for nitrogen which has a slightly larger molecular diameter. Since the size of the micropores of the precursor of the present invention is uniform compared with that of a precursor obtained by means of conventional manufacturing methods, the size of the micropores which have been narrowed is also uniform; and this is believed to have the action of increasing separation efficiency.

The molecular sieving carbon manufactured by the method of the present invention is aimed mainly at the separation of oxygen and nitrogen, and it increases the efficiency of this; however, it can be validly used for the separation of other gas mixtures, for example, the separation of gas mixtures which contain argon.

Activation treatments have the actions of forming new pores in carbonaceous material, and increasing the size of pores which are already opened, by means of the oxidization or corrosion (the carbon is gasified) of carbon by an activating agent (an oxidizing gas). As a result, it believed the amount adsorbed is increased.

The activated carbon manufactured by the method of the present invention, is aimed mainly at the adsorption separation of at least one of carbon dioxide and methane, and it increases the efficiency of this; however, by changing the manufacturing conditions for the above-mentioned activated carbon, it can be validly used for the separation of other gas mixtures, for example, the adsorption separation of lower hydrocarbons such as ethane, propane, and butane; and the adsorption separation of nitrogen from air (nitrogen manufacture).

In addition, in the Examples written below, a situation in which hydrogen gas of high purity is manufactured by removing carbon dioxide is shown; however, applications for the withdrawal of carbon dioxide as a product are possible, and applications for the storage of methane are also possible.

In the following, the present invention is explained in more detail based on Examples and Comparative Examples.

Carbonized Charcoal Starting Material

In the Examples, the carbonized char starting material and its manufacturing method are indicated by the following terms.

Carbonized Charcoal A is Philippine coconut shell char which has been finely crushed (crusher: Model MB-1 manufactured by Chuo Kakouki Co. (Ltd)), made into pellets (compactor: Model PV-5 manufactured by Fuji Powdal (Ltd)) of 2 mm Øx5~6 mm using coal tar as a binder, and then carbonized at 600° C. under a nitrogen gas current.

Carbonized Charcoal B is phenol resin (PGA-4560, product name: Resitop, manufactured by Gun-ei Chemical Industry (Ltd)) which has been hardened at 160° C., finely crushe, then made into pellets of 2 mm Øx5~6 mm using Resitop as a binder, and carbonized under a nitrogen gas current. The carbonization temperature was 600° C. except where indicated otherwise.

Halogen Treatment

In the present invention, except when otherwise indicated in the Examples, the carbonaceous material used to obtain the molecular sieving carbon and the activated carbon was obtained by conducting the following halogen treatment on the carbonized charcoal starting material. Carbonized Charcoal A (15 g) was halogenated (60 minutes) by heating to a temperature of 550° C. and running a gas mixture of 0.1 L/min of halogen (chlorine or bromine) in 0.9 L/min of nitrogen over it. Next, the halogen was eliminated by conducting a heat treatment for 60 minutes at a temperature of 1000° C. under a current of nitrogen gas (3 L/min), and additionally conducting a heat treatment for 30 minutes in an oven at a temperature of 700° C. under a flow of nitrogen gas which had been saturated with steam at room temperature.

For Carbonized Charcoal B (15 g), the halogenation treatment was conducted under the same conditions as Carbonized Charcoal A, with the exception that the halogenation temperature was 500° C.

Activation Treatment

When conducting the activation treatment with carbon dioxide, chlorine treated charcoal (15 g) was heated to 950° C., and 3.5 NL/min of a gas mixture of nitrogen gas and carbon dioxide (carbon dioxide concentration: 29%) was run over it. When conducting the activation treatment with steam, nitrogen gas was saturated with steam at 250° C., and the temperature was 900° C. The time of the activation treatment was adjusted in such a way as to obtain the desired yield. Moreover, NL expresses the volume of the gas converted to standard conditions (0° C., and 1 atm) (hereinafter, this is the same).

Measurement of Amount Adsorbed, Specific Surface Area, and Pore Volume

The measurements of the amount of nitrogen adsorbed in the following Examples were measured by means of a capacity method (device: a BElSORP28 manufactured by Nippon Bell (Ltd)) at conditions of 25° C. and 1 atm. Measurement of the adsorption rate was conducted by finding the amount adsorbed 5 seconds, 15 seconds, 30 seconds, 60 seconds, 120 seconds, 180 seconds, and 300 seconds after adsorption had begun. The amounts of carbon dioxide and methane adsorbed were also measured at 25° C. by means of a volume method (device: the same as mentioned above). In the following, the amount adsorbed is expressed in cc/g, where cc is the volume at 25° C. and 1 atm, and g is the weight of the activated carbon. Before measurement, the specimens were degassed by means of vacuum evacuation for 2 hours at 100° C.

Weight was measured by an electric balance (LIBROR EB-430HW manufactured by Shimadzu Co.).

The specific surface area was calculated from the BET (Brunauer-Emmett-Teller) equation after measuring the adsorption of nitrogen in activated carbon at a temperature of −196° C. The measurement device used an Accusorb 2100-02 model manufactured by Shimadzu Co.

The pore volume was determined by calculating the amount of benzene adsorbed from the variation in weight after nitrogen saturated with benzene at 25° C. was supplied to activated carbon, and this was divided by the density of liquid benzene (0.879 g/cm$^3$).

Figure 3:
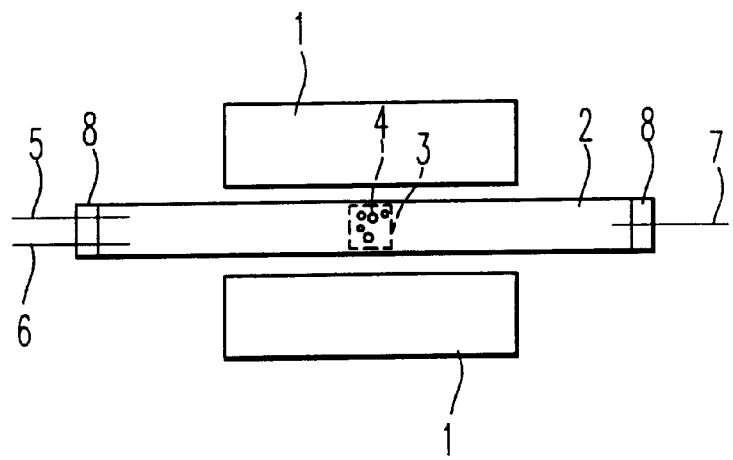
FIG. 3 is an outline diagram of the manufacturing equipment for the carbon adsorbent used in the Examples of the present invention.

Equipment for the Halogen Treatment, the Pore Adjustment, and the Activation Treatment An outline of the equipment for conducting the halogen treatment, pore adjustment, and the activation treatment is shown in FIG. 3. In addition, chlorine is used as an example, however, the same means can also be used for halogen gases such as bromine. In the FIG. 1 is a pipe shaped electric kiln which is equipped with a temperature control device (the pipe shaped kiln is manufactured by Yoshida Seisakusho, the temperature control device is a thermocouple, JIS R, Model SU manufactured by Chino); 2 is a quartz pipe; 3 is a container (gas permeable) for carbonaceous material; 4 is a carbonaceous material; 5 is a nitrogen gas supply pipe; 6 is a supply pipe for chlorine, steam, thermally decomposable hydrocarbon, or oxidizing gas; 7 is an exhaust gas output pipe; and 8 is a rubber stopper.

In the chlorination treatment, nitrogen flows at a predetermined rate from pipe 5, and chlorine gas flows at a predetermined rate from pipe 6. In the high temperature dechlorination treatment, nitrogen gas flows from pipe 5 at a predetermined rate. In the low temperature dechlorination treatment, nitrogen gas containing steam; or incompletely burned LPG flow from pipe 6 at a predetermined rate. In the pore adjustment treatment, nitrogen flows at a predetermined rate from pipe 5, and thermally decomposable hydrocarbon flows at a predetermined rate from pipe 6. In the activation treatment, nitrogen gas flows from pipe 5 at a predetermined rate, and an oxidizing gas flows from pipe 6 at a predetermined rate. The flow rate is measured by a float-type area flowmeter (chlorine gas: PGF-N model manufactured by Ryutai Kogyo (Ltd); other gases: ST-4 model manufactured by Nippon Flowcell Co.).

COMPARATIVE EXAMPLE 1

Conventional Molecular Sieving Carbon

The adsorption rates of oxygen and nitrogen for conventional molecular sieving carbon product (1)a, and (2)b were measured. The amount of oxygen adsorbed 300 seconds after the start of adsorption (approximately equal to the equilibrium adsorption amount for oxygen; hereinafter the same) was (1): 7.3 cc/g, and (2): 8.5 cc/g; and the separation coefficient K was (1): 43.0, and (2): 44.0.

COMPARATIVE EXAMPLE 2

Pore Adjustment Using Methane, Carbonized Charcoal A

A molecular sieving carbon precursor was obtained by conducting a chlorine treatment on Carbonized Charcoal A. 6 grams of this precursor were set in the pore adjustment equipment, and heated to a temperature of 750° C. Pore adjustment was conducted by running a gas mixture of 2.4 L/min of nitrogen gas and 0.6 L/min of methane over it. Three specimens with treatment times for the pore adjustment of (1): 60 minutes, (2): 90 minutes, and (3): 120 minutes were made. The weight increase, and the adsorption rate of nitrogen and oxygen for each specimen were measured. The weight increase due to the impregnation of carbon was (1): 3.5% by weight, (2): 3.9% by weight, and (3): 5.0% by weight. The separation coefficient K was (1): <3, (2): <3 and (3): <6. It was not possible to conduct pore adjustment with methane.

COMPARATIVE EXAMPLE 3

Pore Adjustment Using Xylene, Carbonized Charcoal A

A molecular sieving carbon precursor was obtained by conducting a chlorine treatment on Carbonized Charcoal A. 6 grams of this precursor were set in the pore adjustment equipment, and heated to a temperature of 730° C. Pore adjustment was conducted by running a gas mixture which was obtained by bubbling 3.0 L/min of nitrogen gas through liquid xylene of 20° C. (the xylene concentration was approximately 0.8% by volume) over it. Four specimens with treatment times for the pore adjustment of (1): 10 minutes, (2): 20 minutes, (3): 30 minutes, and (4): 40 minutes were made. The weight increase, and the adsorption rate of nitrogen and oxygen for each specimen were measured. The weight increase was (1): 2.3% by weight, (2): 3.2% by weight, (3): 3.7%, and (4): 3.9% by weight. The separation coefficient K was (1): <1, (2): <3, (3): <3, and (4): <6. It was not possible to conduct pore adjustment with xylene.

COMPARATIVE EXAMPLE 4

A, Pore Adjustment Using Benzene

Carbonized Charcoal A which was carbonized at 1000° C. under a nitrogen gas current (3 L/min) was used as a molecular sieving carbon precursor. Pore adjustment was conducted by running a gas mixture, in which a gas mixture obtained by bubbling 1.2 L/min of nitrogen gas through liquid benzene of 20° C. was additionally mixed with 3.8 L/min of nitrogen gas (the benzene concentration was approximately 2.4% by volume), over it. The treatment time for the pore adjustment was 120 minutes. The adsorption rate of oxygen and nitrogen for the obtained carbon was measured, the amount of oxygen adsorbed 300 seconds after the adsorption began was 7.8 cc/g, and the separation coefficient K was 55.0.

COMPARATIVE EXAMPLE 5

A, Pore Adjustment Using Toluene

Carbonized Charcoal A which was carbonized at 1000° C. under a nitrogen gas current (3 L/min) was used as a molecular sieving carbon precursor. Pore adjustment was conducted by running a gas mixture, in which a gas mixture obtained by bubbling 3.0 L/min of nitrogen gas through liquid toluene of 20° C. was additionally mixed with 1.0 L/min of nitrogen gas (the toluene concentration was approximately 2.2% by volume) over it. The treatment time for the pore adjustment was 120 minutes. The adsorption rate of oxygen and nitrogen for the obtained carbon was measured. The amount of oxygen adsorbed 300 seconds after the adsorption began was 8.4 cc/g, and the separation coefficient K was 52.3.

EXAMPLE 1

Pore Adjustment Using Benzene, Carbonized Charcoal A

A molecular sieving carbon precursor was obtained by conducting a chlorine treatment on Carbonized Charcoal A. 6 grams of this precursor were set in the pore adjustment equipment, and heated to a temperature of 730° C. Pore adjustment was conducted by running a gas mixture, in which a gas mixture obtained by bubbling 1.2 L/min of nitrogen gas through liquid benzene of 20° C. was additionally mixed with 3.8 L/min of nitrogen gas (the benzene concentration was approximately 2.4% by volume), over it. When the treatment time for the pore adjustment was 120 minutes, the weight increase was 6.7%. The adsorption rate of oxygen and nitrogen for the obtained carbon was measured. The amount of oxygen adsorbed 300 seconds after the adsorption began was 9.9 cc/g. The separation coefficient K was 60.0. It was possible to obtain excellent pore adjustment using benzene.

EXAMPLE 2

Pore Adjustment Using Toluene, Carbonized Charcoal A

A molecular sieving carbon precursor was obtained by conducting a chlorine treatment on Carbonized Charcoal A. 6 grams of this precursor were set in the pore adjustment equipment, and heated to a temperature of 730° C. Pore adjustment was conducted by running a gas mixture, in which a gas mixture obtained by bubbling 3.0 L/min of nitrogen gas through liquid toluene of 20° C. was additionally mixed with 1.0 L/min of nitrogen gas (the toluene concentration was approximately 2.2% by volume), over it. When the treatment time for the pore adjustment was 60 minutes, the weight increase was 5.2% by weight. The adsorption rate of oxygen and nitrogen for the obtained carbon was measured. The amount of oxygen adsorbed 300 seconds after the adsorption began was 10.9 cc/g. The separation coefficient K was 54.0. It was possible to obtain excellent pore adjustment using toluene.

EXAMPLE 3

A, Pore Adjustment Using Benzene, Effect of the Chlorination Temperature

The molecular sieving carbon precursor of this Example used Carbonized Charcoal A, which had been carbonized at 650° C., and then chlorinated at a temperature of (1): 500° C., and (2): 600° C. The treatment time for the pore adjustment was 90 minutes. The other conditions were the same as in Example 1. The amount of nitrogen adsorbed after the chlorination treatment was (1): 14.2 cc/g, and (2): 14.1 cc/g. The weight increase due to the pore adjustment step was (1): 10.7% by weight, and (2): 7.0% by weight. The amount of oxygen adsorbed 300 seconds after the adsorption began was (1): 10.3 cc/g, and (2): 10.6 cc/g. The separation coefficient K was (1): 42.4, and (2): 66.6.

EXAMPLE 4

A, Pore Adjustment Using Toluene, Effect of the Carbonization Temperature

The molecular sieving carbon precursor of this Example used Carbonized Charcoal A, which had been carbonized at (1) 650° C. and (2) 700° C., and then chlorinated at a temperature of 600° C. The treatment time for the pore adjustment was 45 minutes. The other conditions were the same as in Example 2. The weight increase due to the pore adjustment step was (1): 5.3% by weight, and (2): 4.0% by weight. The amount of oxygen adsorbed 300 seconds after the adsorption began was (1): 11.2 cc/g, and (2): 10.2 cc/g. The separation coefficient K was (1): 54.0, and (2): 48.0.

EXAMPLE 5

Pore Adjustment Using Benzene, Carbonized Charcoal B

A molecular sieving carbon precursor was obtained by conducting a chlorine treatment on Carbonized Charcoal B. 6 grams of this precursor were set in the pore adjustment equipment, and heated to a temperature of 700° C. Pore adjustment was conducted by running a gas mixture, in which a gas mixture obtained by bubbling 1.2 L/min of nitrogen gas through liquid benzene of 20° C. was additionally mixed with 3.8 L/min of nitrogen gas (the benzene concentration was approximately 2.4% by volume), over it. When the treatment time for the pore adjustment was 150 minutes, the weight increase was 15.0% by weight. The adsorption rate of oxygen and nitrogen for the obtained carbon was measured. The amount of oxygen adsorbed 300 seconds after the adsorption began was 11.1 cc/g. The separation coefficient K was 55.0. It was possible to obtain excellent pore adjustment using benzene.

EXAMPLE 6

B, Pore Adjustment Using Toluene

The molecular sieving carbon precursor of this Example used Carbonized Charcoal B, which had been carbonized at 750° C., and then chlorine treated at a temperature of 550° C. 6 grams of this precursor were set in the pore adjustment equipment, and heated at a temperature of 700° C. Pore adjustment was conducted by running a gas mixture, in which a gas mixture obtained by bubbling 3.0 L/min of nitrogen gas through liquid toluene of 20° C. was additionally mixed with 1.0 L/min of nitrogen gas (the toluene concentration was approximately 2.2% by volume), over it. When the treatment time for the pore adjustment was 80 minutes, the weight increase was 5.5% by weight. The adsorption rate of oxygen and nitrogen for the obtained carbon was measured. The amount of oxygen adsorbed 300 seconds after the adsorption began was 11.5 cc/g. The separation coefficient K was 48.0. It was possible to obtain excellent pore adjustment using toluene.

EXAMPLE 7

Dechlorination Using Incompletely Burned LPG Exhaust Gas

Carbonized Charcoal A (10 g) was chlorinated (60 minutes) by heating to a temperature of 700° C., and running a gas mixture of 0.1 L/min of chlorine in 0.9 L/min of nitrogen over it. Next, it was heat-treated for 60 minutes at a temperature of 1000° C. under a current of nitrogen gas (3 L/min). Next, a molecular sieving carbon precursor was obtained by eliminating the chlorine by conducting a heat treatment at 700° C. in incompletely burned LPG exhaust gas (approximately 3 L/min). This precursor was set in the pore adjustment equipment and heated to a temperature of 730° C. Pore adjustment was conducted by running a gas mixture, in which a gas mixture obtained by bubbling 3.0 L/min of nitrogen gas through liquid toluene of 20° C. was additionally mixed with 1.0 L/min of nitrogen gas (the toluene concentration was approximately 2.2% by volume), over it. When the treatment time for the pore adjustment was 60 minutes, the weight increase was 5.2% by weight. The adsorption rate of oxygen and nitrogen for the obtained carbon was measured, and the amount of oxygen adsorbed 300 seconds after the adsorption began was 10.8 cc/g. The separation coefficient K was 55.1. It was also possible to obtain excellent pore adjustment for a precursor on which a dechlorination treatment was conducted using incompletely burned LPG exhaust gas.

EXAMPLE 8

Carbonized Charcoal B, Bromine Treatment

A bromination treatment was conducted on Carbonized Charcoal B (10 g) by respectively heating Specimen (1) at a temperature of 500° C. for 3 hours, Specimen (2) at a temperature of 600° C. for 2 hours, and Specimen (3) at a temperature of 700° C. for 1 hour under a nitrogen gas flow (1 L/min) which contained bromine gas at 8% by weight. Next, a debromination treatment was conducted by heating each specimen for 30 minutes at a temperature of 1000° C. under a nitrogen gas current (3 L/min), and additionally heating for 15 minutes at a temperature of 700° C. under a nitrogen gas current which had been saturated with steam at 25° C. When the amount of nitrogen gas adsorbed for each specimen was measured, (1) was 17.8 cc/g, (2) was 16.6 cc/g, and (3) was 15.0 cc/g.

Next, pore adjustment was conducted on each of the obtained specimens as precursors. Each specimen was heated to a temperature of 700° C. Pore adjustment was conducted by running a gas mixture, in which a gas mixture obtained by bubbling 3.0 L/min of nitrogen gas through liquid toluene of 20° C. was additionally mixed with 1.0 L/min of nitrogen gas (the toluene concentration was approximately 2.2% by volume), over it. When the treatment time for the pore adjustment was 90 minutes, the weight increase was (1): 4.8% by weight, (2): 4.5% by weight, and (3): 4.0% by weight. The adsorption rate of oxygen and nitrogen for the obtained carbon was measured. The amount of oxygen adsorbed 300 seconds after the adsorption began was (1): 12.6 cc/g, (2): 12.5 cc/g, and (3): 11.5 cc/g. The separation coefficient K was (1): 65.0, (2): 62.9, and (3): 61.1. An excellent molecular sieving carbon was obtained by conducting a pore adjustment on a bromine treated carbon.

The amount of oxygen adsorbed and the separation coefficient for the molecular sieving carbons obtained by means of the above-mentioned Examples and Comparative Examples are gathered together and shown in Table 2.

TABLE 2

The Amount of Oxygen Adsorbed and the Separation Coefficient for the Molecular Sieving Carbons

|  |  | A cc/g | B | C | D °C | E °C | F °C | G °C | H °C | I min | J |
|---|---|---|---|---|---|---|---|---|---|---|---|
| Comparative Example 1 | (1) | 7.3 | 43.0 | a | — | — | — | — | — | — | — |
|  | (2) | 8.5 | 44.0 | b | — | — | — | — | — | — | — |
| Comparative Example 2 | (1) |  | <3 | A | 600 | 550 | 1000 | 700 | 750 | 60 | methane |
|  | (2) |  | <3 | A | 600 | 550 | 1000 | 700 | 750 | 90 | methane |
|  | (3) |  | <6 | A | 600 | 550 | 1000 | 700 | 750 | 120 | methane |
| Comparative Example 3 | (1) |  | <1 | A | 600 | 550 | 1000 | 700 | 750 | 10 | xylene |
|  | (2) |  | <3 | A | 600 | 550 | 1000 | 700 | 750 | 20 | xylene |
|  | (3) |  | <3 | A | 600 | 550 | 1000 | 700 | 750 | 30 | xylene |
|  | (4) |  | <6 | A | 600 | 550 | 1000 | 700 | 750 | 40 | xylene |
| Comparative Example 4 |  | 7.8 | 55.0 | A | 1000 | — | — | — | 730 | 120 | benzene |
| Comparative Example 5 |  | 8.4 | 52.3 | A | 1000 | — | — | — | 730 | 120 | toluene |
| Example 1 |  | 9.9 | 60.0 | A | 600 | 550 | 1000 | 700 | 730 | 120 | benzene |
| Example 2 |  | 10.9 | 54.0 | A | 600 | 550 | 1000 | 700 | 730 | 120 | toluene |
| Example 3 | (1) | 10.3 | 42.4 | A | 650 | 500 | 1000 | 700 | 730 | 120 | benzene |
|  | (2) | 10.6 | 66.6 | A | 650 | 600 | 1000 | 700 | 730 | 120 | benzene |
| Example 4 | (1) | 11.2 | 54.0 | A | 650 | 600 | 1000 | 700 | 730 | 45 | toluene |
|  | (2) | 10.2 | 48.0 | A | 700 | 600 | 1000 | 700 | 730 | 45 | toluene |
| Example 5 |  | 11.1 | 55.0 | B | 600 | 500 | 1000 | 700 | 700 | 150 | benzene |
| Example 6 |  | 11.5 | 48.0 | B | 750 | 500 | 1000 | 700 | 700 | 80 | toluene |
| Example 7 |  | 10.8 | 55.1 | A | 600 | 700 | 1000 | 700 | 730 | 120 | toluene |
| Example 8 | (1) | 12.6 | 65.0 | A | 600 | 500 | 1000 | 700 | 700 | 80 | toluene |
|  | (2) | 12.5 | 62.9 | A | 600 | 600 | 1000 | 700 | 700 | 80 | toluene |
|  | (3) | 11.5 | 61.1 | A | 600 | 700 | 1000 | 700 | 700 | 80 | toluene |

Figure 4:
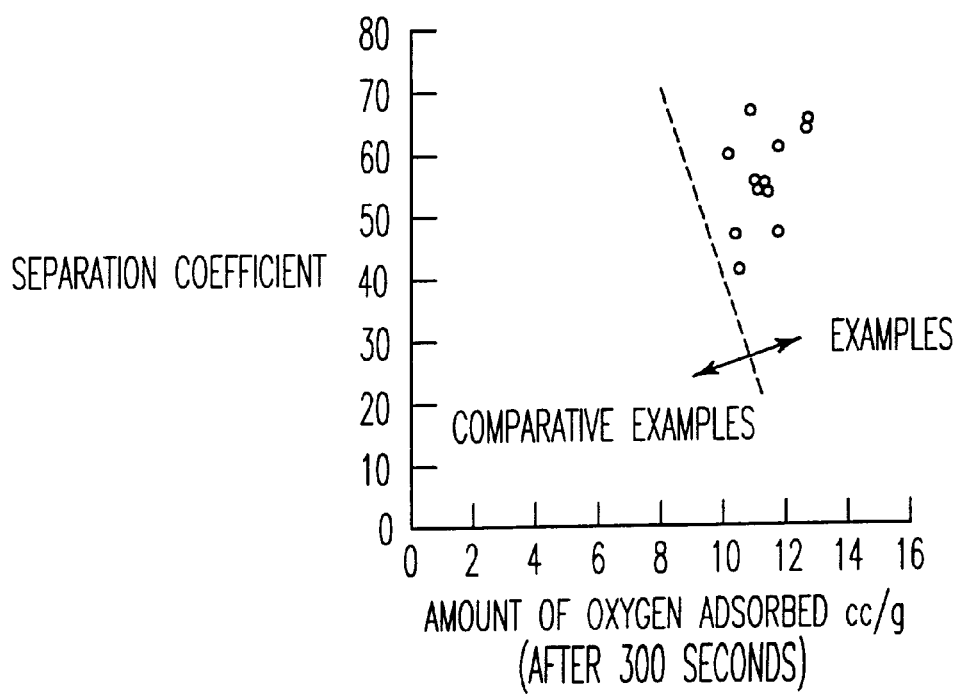
FIG. 4 is a graph of the relationship between the separation coefficient for the amount of oxygen adsorbed by the molecular sieving carbons of the Comparative Examples and the Examples.

A  Amount of oxygen adsorbed 300 seconds after adsorption began cc/g
B  Separation Coefficient K
C  Type of Carbonized Charcoal
D  Carbonization Temperature ° C.
E  Temperature of the Chlorination or Bromination ° C.
F  Temperature of the High Temperature Dechlorination or Debromination ° C.
G  Temperature of the Low Temperature Dechlorination or Debromination ° C.
H  Temperature of the Pore Adjustment ° C.
I  Time of Pore Adjustment min
J  Type of Thermally Decomposable Hydrocarbon The relationships between the amount of oxygen adsorbed and the separation coefficient for the Comparative Examples and the Examples are shown in FIG. 4. The further a molecular sieving carbon is to the upper right area of the same Figure, the better its separation efficiency. In the Figure, the amounts of oxygen adsorbed and the separation coefficients for the molecular sieving carbons of the present invention are further to the upper right than those for the Comparative Examples, and it is clear that the molecular sieving carbons of the present invention are better for separating oxygen and nitrogen.

Pressure Swing Adsorption Device for Separating Air

Figure 5:
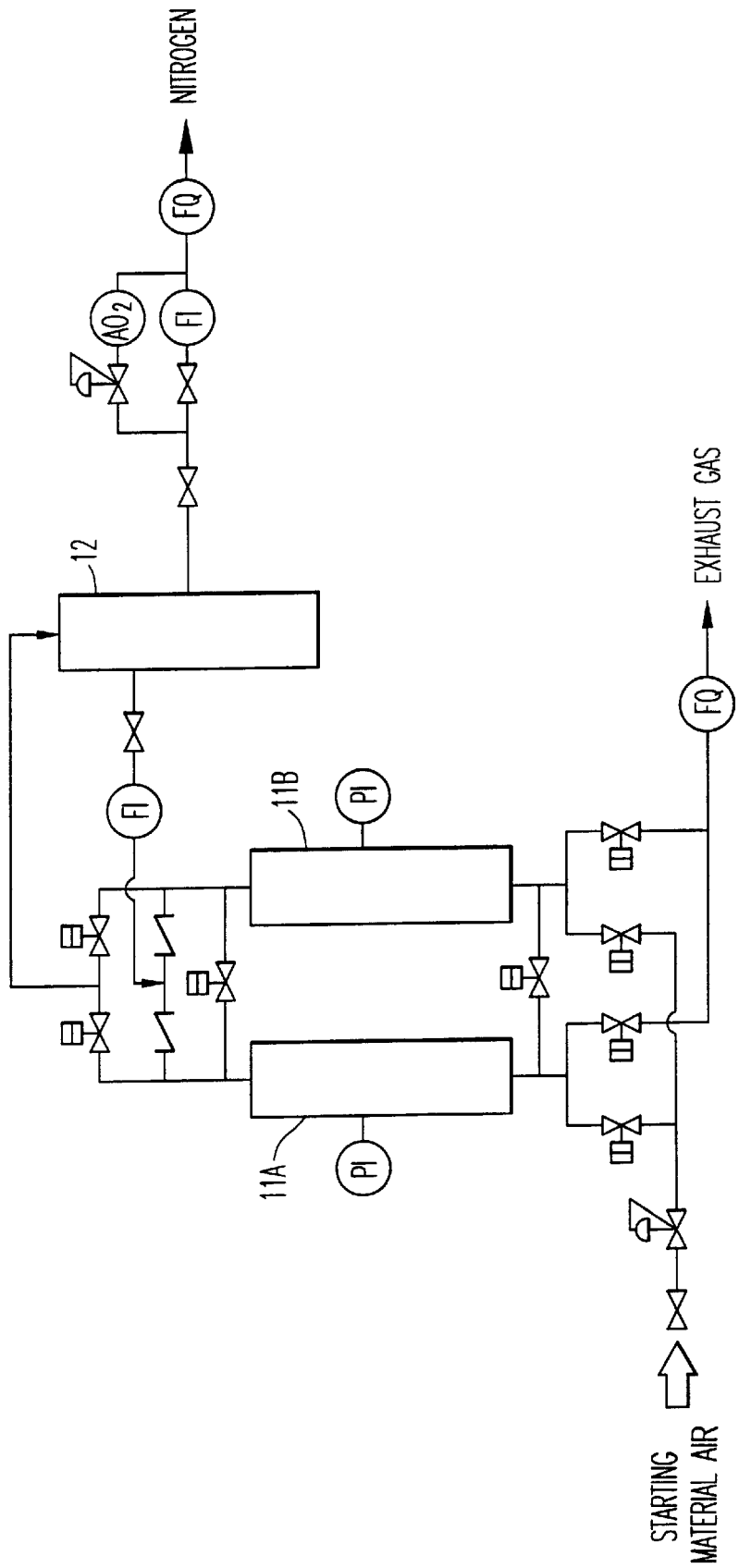
FIG. 5 is a schematic flow diagram of a two column pressure swing adsorption device.

A schematic flow diagram of the pressure swing adsorption for the purpose of evaluating the efficiency of the molecular sieving carbon of the present invention is shown in FIG. 5. The adsorption separation process steps for this device are shown in Table 3. In the following, the process steps are explained based on FIG. 5 and Table 3.

FIG. 5 is a schematic flow diagram of a two column pressure swing adsorption device for evaluating the behavioral performances of the molecular sieving carbon of the present invention.

Pressurized starting material air is introduced into the bottom of one of two adsorption columns 11A, and oxygen is selectively adsorbed and removed by the molecular sieving carbon which fills the column. Concentrated nitrogen flows out of the top of the adsorption column and is stored in product tank 12. While this is taking place, the pressure of the other adsorption column 11B is reduced, and, under atmospheric pressure, a part of the concentrated nitrogen gas from the product tank 12 is run into the top of the adsorption column as a purge gas eliminating adsorbed oxygen, thereby regenerating the molecular sieving carbon.

When the required time is completed, each switching valve is fully closed, and for the purpose of equalizing the pressure in both adsorption columns, only the switching valves for equalizing pressure at the top and the bottom of the adsorption columns are fully open.

When the required time for the pressure equalization operation is over, pressurized starting material air is introduced into the bottom of the next adsorption column 11B, and regeneration of the other adsorption column 11A is begun.

While repeating this operation, the nitrogen which is continually withdrawn is adjusted to a constant pressure by a pressure control valve, and is separated as a nitrogen product of constant purity.

The nitrogen yield (%) is shown by (the amount of nitrogen product)÷(amount of nitrogen in the starting material air)×100.

Table 3 is an adsorption column process step diagram for the pressure swing adsorption device for the purpose of actively evaluating the molecular sieving carbon of the present invention.

TABLE 3

Adsorption Column Process Step Diagram

| Step | Adsorption Column A | Adsorption Column B | Time (sec) |
|---|---|---|---|
| 1 | Pressurized Adsorption | Atmospheric Pressure Purge Regeneration | 120 |
| 2 | Pressure Equalization | Pressure Equalization | 1 |
| 3 | Atmospheric Pressure Purge Regeneration | Pressurized Adsorption | 120 |
| 4 | Pressure Equalization | Pressure Equalization | 1 |

The device which is used in the pressure swing adsorption experiments shown in the following Examples is a two column model, each column has a molecular sieving carbon charging capacity of 1 L, and the column length is 690 mm.

The operating conditions were an operation temperature of 25° C., an adsorption pressure of 6.5 kgf/cm$^2$G (gage pressure), an adsorption time of 120 seconds, a regeneration pressure of atmospheric pressure, a regeneration time of 120 seconds, and a purge flow rate of 30 L/h. After the adsorption step was completed, a pressure equalization operation of 1 second was simultaneously conducted at the top and the bottom of the column. The starting material air was dehumidified to a pressured dew point of 5° C. by means of freeze air dryer. The purity of the nitrogen product was adjusted using the aperture of the needle valve of the nitrogen product outlet. The oxygen concentration of the nitrogen product was measured using a zirconia oxygen concentration meter (Model LC-800 manufactured by Toray Engineering (Ltd)), and the flow rate of the nitrogen product was measured by means of a dry integrating gas meter (Model DC-5 manufactured by Shinagawa Seiki (Ltd)).

COMPARATIVE EXAMPLE 6

The above-mentioned pressure swing adsorption device was charged with conventional molecular sieving carbon a, and an air separation experiment was conducted. When the oxygen concentration in the nitrogen product was 0.1%, the amount of nitrogen generated was 80 NL/h, and the nitrogen yield was 35.5%.

COMPARATIVE EXAMPLE 7

The above-mentioned pressure swing adsorption device was charged with conventional molecular sieving carbon b, and an air separation experiment was conducted. When the oxygen concentration in the nitrogen product was 0.1%, the amount of nitrogen generated was 89 NL/h, and the nitrogen yield was 38.0%.

EXAMPLE 9

The above-mentioned pressure swing adsorption device was charged with molecular sieving carbon manufactured under the same conditions as (2) of Example 4, and an air separation experiment was conducted. When the oxygen concentration in the nitrogen product was 0.1%, the amount of nitrogen generated was 120 NL/h, and the nitrogen yield was 42.0%.

EXAMPLE 10

The above-mentioned pressure swing adsorption device was charged with molecular sieving carbon manufactured under the same conditions as Example 6, and an air separation experiment was conducted. When the oxygen concentration in the nitrogen product was 0.1%, the amount of nitrogen generated was 130 NL/h, and the nitrogen yield was 44.0%.

A comparison of Comparative Examples 6 and 7, and Examples 9 and 10 is shown in Table 4. When pressure swing adsorption is conducted using molecular sieving carbon obtained by conducting a pore adjustment on chlorine treated carbon precursor, the amount of nitrogen generated and the nitrogen yield are both greater than that when conventional products are used, and the oxygen and nitrogen can be very efficiently separated.

TABLE 4

Amount Of Nitrogen of 99.9% Purity Generated and Yield

|  | Amount Generated (NL/h) | Yield (%) |
|---|---|---|
| Comparative Example 6 | 80 | 35.5 |
| Comparative Example 7 | 89 | 38.0 |
| Example 9 | 120 | 42.0 |
| Example 10 | 130 | 44.0 |

From the results in Table 4, using the Comparative Examples as a base, the increases in the nitrogen yield and the amount of nitrogen generated per volume of adsorption column, and the reductions in the amount of air and the volume of the adsorption column required to generate the same amount of nitrogen for the Examples are shown in Table 5. The volume of the adsorption columns can be reduced by 26~38%, and the amount of air can be reduced by 10~19%.

TABLE 5

Comparison of the Amount of Nitrogen Generated and the Yield

|  | Increase in Generated Amount | Decrease in Column Capacity | Increase in Yield | Decrease in Amount of Air |
|---|---|---|---|---|
| Example 9/Comparative Ex. 6 | 1.50 (50% increase) | 0.67 (33% decrease) | 1.18 (18% increase) | 0.85 (15% decrease) |
| Example 10/Comparative Ex. 6 | 1.63 (63% increase) | 0.62 (38% decrease) | 1.24 (24% increase) | 0.81 (19% decrease) |
| Example 9/Comparative Ex.7 | 1.35 (35% increase) | 0.74 (26% decrease) | 1.10 (10% increase) | 0.90 (10% decrease) |
| Example 10/Comparative Ex. 7 | 1.46 (46% increase) | 0.68 (32% decrease) | 1.16 (16% increase) | 0.86 (14% decrease) |

EXAMPLE 11

Activation of Chlorine Treated Carbon

Table 6 shows the results measured for the specific surface area and pore volume for activated carbon obtained by conducting a chlorine treatment on Carbonized Charcoal A and B, and conducting an activation treatment to obtain the activation yields shown in the same Table in the activation atmospheres and temperatures shown in the same Table.

TABLE 6

| Specimen | Type of Carbonized Charcoal | Activation Atmosphere | Activation Temperature °C. | Activation Yield % | Specific Surface Area m²/g | Pore volume cm³/g |
|---|---|---|---|---|---|---|
| 1 (*1) | A | — | — | — | 310 | 0.08 |
| 2 | A | $CO_2$ | 950 | 83 | 910 | 0.30 |
| 3 | A | $CO_2$ | 950 | 78 | 1150 | 0.36 |
| 4 | A | $CO_2$ | 950 | 71 | 1510 | 0.44 |
| 5 | A | $CO_2$ | 950 | 50 | 1960 | 0.66 |
| 6 | A | $H_2O$ | 900 | 75 | 1340 | 0.41 |
| 7 | B | $CO_2$ | 950 | 95 | 460 | 0.12 |
| 8 | B | $CO_2$ | 950 | 79 | 1200 | 0.38 |
| 9 | B | $CO_2$ | 950 | 70 | 1460 | 0.43 |
| 10 | B | $CO_2$ | 950 | 57 | 1830 | 0.63 |
| 11 | B | $H_2O$ | 900 | 64 | 1640 | 0.55 |
| 12 (*2) | A | $CO_2$ | 950 | 80 | 920 | 0.28 |
| 13 (*3) | A | $CO_2$ | 950 | 65 | 1540 | 0.53 |

Note:
(*1) Chlorine treated carbon which was not given an activation treatment
(*2) Example 14 specimen (1)
(*3) Example 14 Specimen (2)

EXAMPLE 12

Adsorption of Carbon Dioxide

Figure 6:
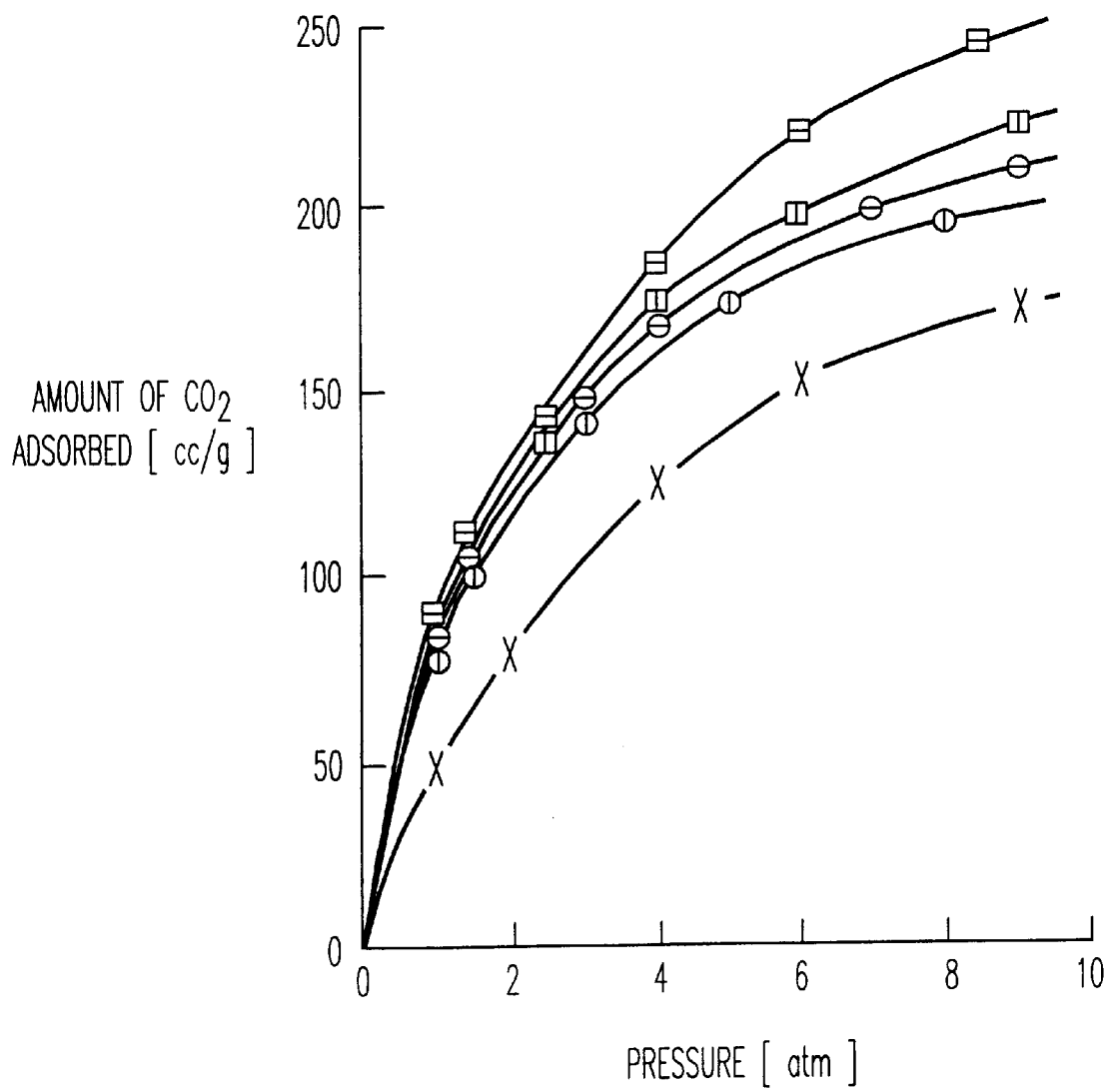
FIG. 6 is an isotherm of carbon dioxide adsorption showing the results of the Examples of the present invention.

FIG. 6 shows carbon dioxide adsorption isotherms at 250° C. for one kind of commercially available activated carbon (Shirasagi manufactured by Takeda Chemical Industries (Ltd)) and four (4) kinds of activated carbon of the present invention.

The manufacturing method for the activated carbon of the present invention is as follows.
Activated Carbon A-75: Carbonized Charcoal A was chlorine treated, and activated so that it had an activation yield of 75%.
Activated Carbon A-65: Carbonized Charcoal A was chlorine treated, and activated so that it had an activation yield of 65%.
Activated Carbon B-80: Carbonized Charcoal B was chlorine treated, and activated so that it had an activation yield of 80%.
Activated Carbon B-70: Carbonized Charcoal B was chlorine treated, and activated so that it had an activation yield of 70%.

As is clear from FIG. 6, the amount of carbon dioxide adsorbed by the activated carbon of the present invention is greater than that for commercially available activated carbon, for example, at 1 atm it is 1.7~1.8 times that of the commercial available product.

EXAMPLE 13

Adsorption of Methane

Figure 7:
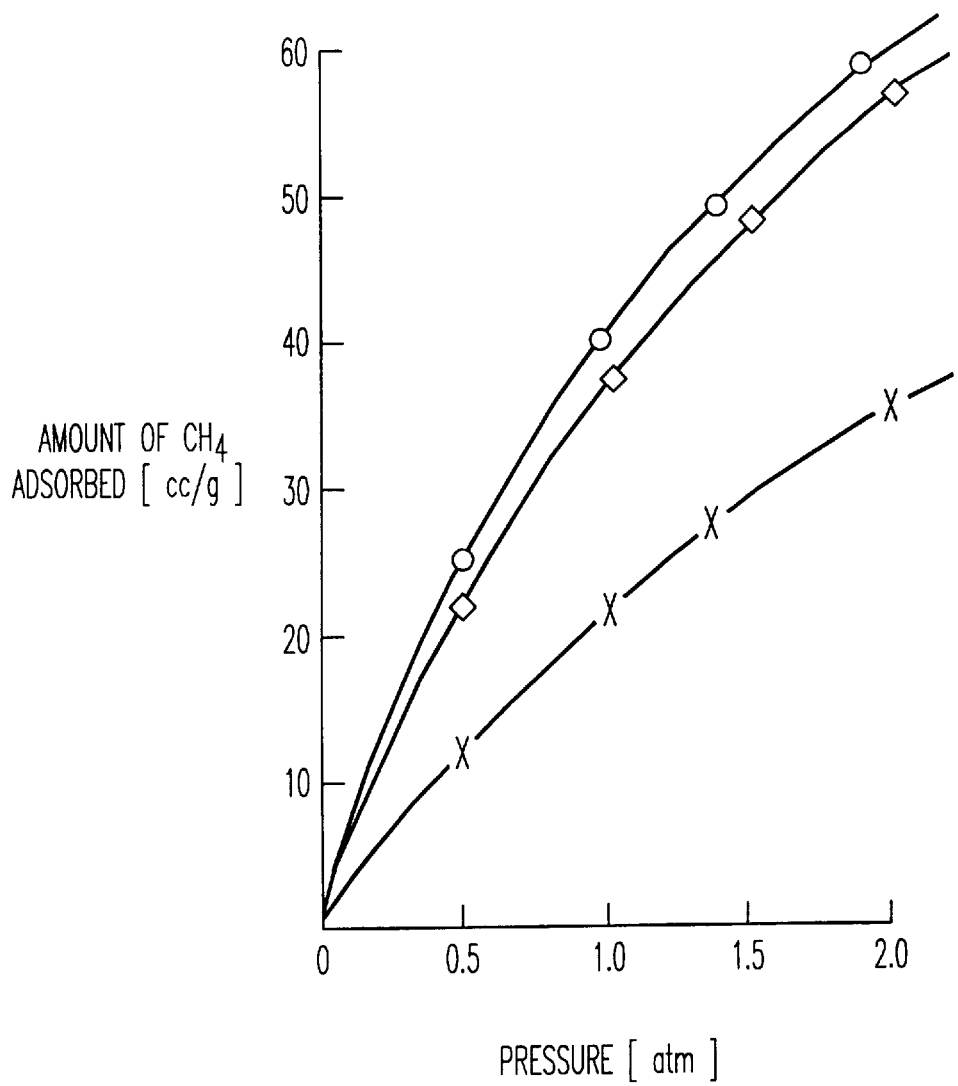
FIG. 7 is an isotherm of methane adsorption showing the results of the Examples of the present invention.

FIG. 7 shows methane adsorption isotherms at 25° C. for one kind of commercially available activated carbon (Shirasagi manufactured by Takeda Chemical Industries (Ltd)) and for two kinds of activated carbon of the present invention.

The manufacturing method for the activated carbon of the present invention is as follows.
Activated Carbon A-80: Carbonized Charcoal A was chlorine treated, and activated so that it had an activation yield of 80%.
Activated Carbon A-70: Carbonized Charcoal A was chlorine treated, and activated so that it had an activation yield of 70%.

As is clear from FIG. 6, the amount of carbon dioxide adsorbed by the activated carbon of the present invention is greater than that for commercially available activated carbon, for example, at 1 atm it is 1.7~1.8 times that of the commercial available product.

EXAMPLE 14

Bromine Treatment, Adsorption of Carbon Dioxide

Carbonized Charcoal A (15 g) was given a bromination treatment by heating for 60 minutes at a temperature of 600° C. under a nitrogen gas current (1 L/min) which contained bromine gas ($Br_2$) at 8% by weight. Next, a debromination treatment was conducted by heating for 30 minutes at a temperature of 900° C. under a nitrogen gas current (3 L/min), and additionally, heating for 15 minutes at a temperature of 700° C. under a nitrogen gas flow (1 L/min) which had been saturated with steam at 250° C. An activation treatment was conducted on the bromine treated carbon obtained in this way under a carbon dioxide gas atmosphere of the above-mentioned conditions. The time for the activation treatment was adjusted so that the activation yield for Specimen (1) was 80%, and the activation yield for Specimen (2) was 65%.

When the amounts of carbon dioxide adsorbed by the obtained carbonaceous materials were measured at 25° C. and 1 atm, Specimen (1) was 84.5 cc/g, and Specimen (2) was 87.1 cc/g. In contrast, commercially available product (Shirasagi manufactured by Takeda Chemical Industries (Ltd)) was 50.2 cc/g. It was also possible to obtain the results of the present invention using bromine gas.

Pressure Swing Adsorption Device for Manufacturing Hydrogen

Figure 8:
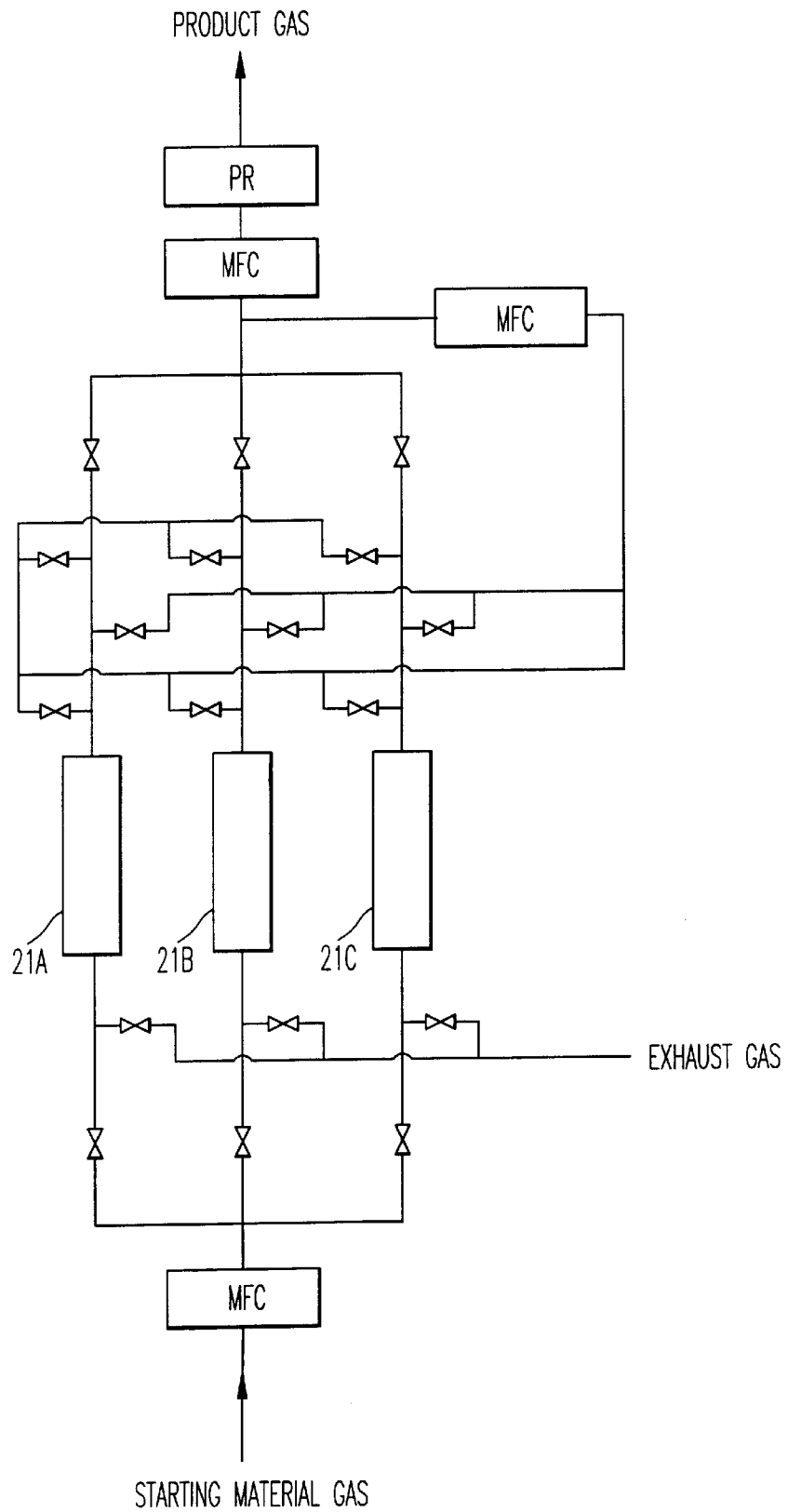
FIG. 8 is a schematic flow diagram of a three column pressure swing adsorption device.

FIG. 8 and Table 7 show a process diagram and a schematic flow diagram for a pressure swing adsorption device which generates high purity hydrogen from a gas mixture comprising at least one of carbon dioxide or methane for the purpose of evaluating the efficiency of the activated carbon of the present invention. In the following, the process steps are explained based on FIG. 8 and Table 7.

FIG. 8 is a schematic flow diagram of a three column pressure swing adsorption device for evaluating the behavioral performances of the activated carbon of the present invention. In the Figure, PR is the pressure control valve, and MFC is the mass flow controller. In addition, references 21A, 21B, and 21C indicate each of the independent adsorption columns.

Pressurized starting material gas mixture was introduced into the bottom of one of the three adsorption columns 21A, and carbon dioxide and other components other than hydrogen were selectively adsorbed and removed by the adsorbent filling the column. Concentrated hydrogen flowed out of the top of the adsorption column and was stored in a product tank. While this was taking place, adsorption column 21B and adsorption column 21C were connected by means of the operation of valves and the pressure equalized. Adsorption column 21B was pressurized with hydrogen gas. The pressure of adsorption column 21C was reduced to atmospheric pressure by continuing the above-mentioned equalization, and, in addition, by purging with hydrogen gas, adsorption column 21C was regenerated.

By successively repeating the above steps, hydrogen gas of high purity can be obtained from a mixed starting material gas. The amount of high purity hydrogen gas taken out was adjusted using the pressure control valve.

The hydrogen yield (%) is shown by (the amount of hydrogen product)÷(amount of hydrogen in the starting material gas)×100.

Table 7 shows an adsorption column process diagram for the three column pressure swing adsorption device, shown in FIG. 8, for the purpose of evaluating the behavioral performances of the activated carbon of the present invention.

TABLE 7

Adsorption Column Process Step Diagram

| Step | Adsorption Column A | Adsorption Column B | Adsorption Column C | Time (sec) |
|---|---|---|---|---|
| 1 | Pressurized Adsorption | Pressure Equalization | Pressure Equalization | 30 |
| 2 | Pressurized Adsorption | Pressure Increase | Pressure Decrease | 80 |
| 3 | Pressurized Adsorption | Pressure Increase | Purge | 190 |
| 4 | Pressure Equalization | Pressurized Adsorption | Pressure Equalization | 30 |
| 5 | Pressure Decrease | Pressurized Adsorption | Pressure Increase | 80 |
| 6 | Purge | Pressurized Adsorption | Pressure Increase | 190 |
| 7 | Pressure Equalization | Pressure Equalization | Pressurized Adsorption | 30 |
| 8 | Pressure Increase | Pressure Decrease | Pressurized Adsorption | 80 |
| 9 | Pressure Increase | Purge | Pressurized Adsorption | 190 |

EXAMPLE 15

Separation of a $H_2+CO_2$ Gas Mixture

The separation efficiency of the activated carbon of the present invention was tested by generating high purity hydrogen by removing carbon dioxide by means of the three column pressure swing adsorption device, shown in FIG. 8, using a gas mixture of 75% by volume of hydrogen ($H_2$) and 25% by volume of carbon dioxide ($CO_2$) as a starting material gas.

The column had an interior diameter of 43.0 mm, a length of 1000 mm, and an internal capacity of 1.45 L. The activated char of the present invention (B-70) was charged into the this column. The activated carbon used for the purpose of comparison was Shirasagi manufactured by Takeda Chemical Industries (Ltd).

The operation temperature was 25° C., and the adsorption pressure was 9.5 kgf/cm$^2$G (gage pressure). The amount of high purity hydrogen taken out was adjusted using the aperture of the pressure control valve. The switching time for the columns was as shown in Table 7.

Figure 9:
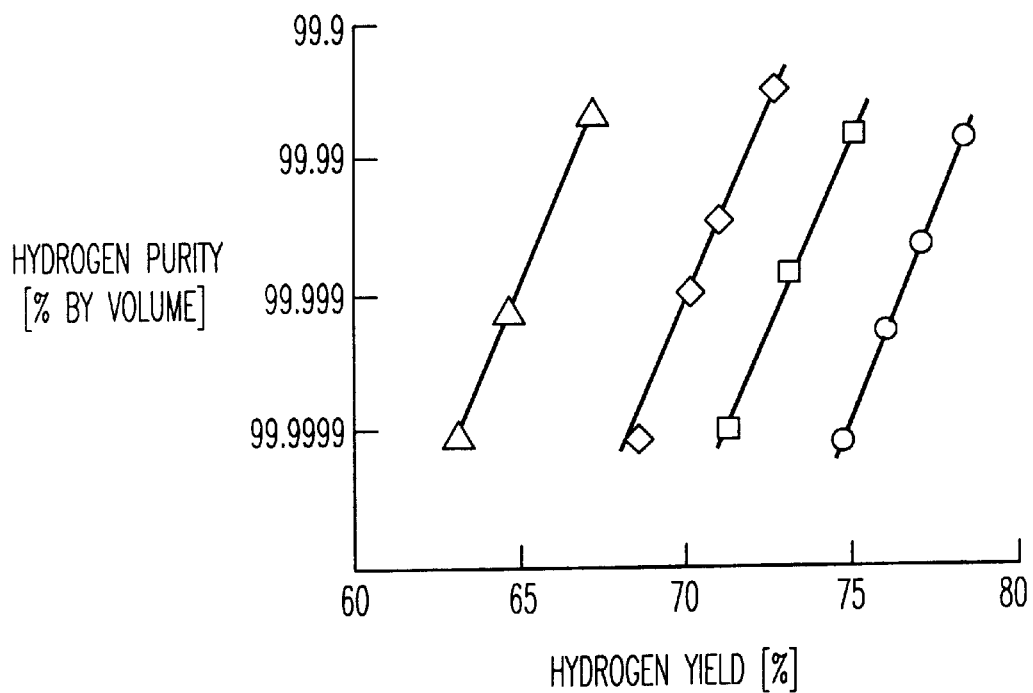
FIG. 9 is a graph of the relationship between the yield and the hydrogen purity of gas mixture separation of $H_2+CO_2$ showing the results of the Examples of the present invention.

The concentration of carbon dioxide was measured by means of hydrogen flame ionization detector gas chromatography (Type G2800F, Yanagimoto Seisakusho, this is the same in the following Examples). The gas flow was measured using a mass flow controller (Model 3710, Kojima Seisakusho (Ltd)), this is the same in the following Examples). The relationship between the yield and the purity of the hydrogen product is shown in FIG. 9.

When the purity of hydrogen is 99.999% by volume (the concentration of carbon dioxide in the hydrogen is 10 ppm by volume) and the starting material gas mixture treatment rate is 20 NL/min, the hydrogen yield for commercially available activated carbon is 64.8%, in contrast, it is 70.2% for the activated carbon of the present invention, and this is a 5.4 point improvement.

When the purity of hydrogen is 99.999% by volume (the concentration of carbon dioxide in the hydrogen is 10 ppm by volume) and the starting material gas mixture treatment rate is 15 NL/min, the hydrogen yield for commercially available activated carbon is 73.0%, in contrast, it is 76.5% for the activated carbon of the present invention, and this is a 3.5 point improvement.

EXAMPLE 16

Manufacture of Hydrogen from Methanol Decomposition Gas

The separation efficiency of the activated carbon of the present invention was tested by generating high purity hydrogen by removing carbon dioxide and other components by means of the three column pressure swing adsorption device, shown in FIG. 8, using a reformed gas of methanol and steam as a starting material.

The composition of the reformed gas was carbon dioxide ($CO_2$) 24.0% by volume, carbon monoxide (CO) 1.0% by volume, methane ($CH_4$) 4 ppm by volume, nitrogen ($N_2$) 80 ppm by volume, water 0.5% by volume, and hydrogen 74.5% by volume.

The column had an interior diameter of 54.9 mm, a length of 4000 mm, and an internal capacity of 9.46 L. In order, from the bottom, the column was charged with alumina gel (Autopurex MA4B-312, Marutani Kakouki) for a length of 200 m, an activated carbon of the present invention (B-70) for a length of 2800 mm, and zeolite (Type 5A, Union Showa) for a length of 1000 mm. The reformed gas starting material was supplied from the bottom of the column.

As a Comparative Example, commercially activated carbon (Shirasagi, Takeda Chemical Industries (Ltd)) only was used, and in other ways the column used was the same as the one above.

The alumina gel mainly adsorbs water, the activated carbon mainly adsorbs carbon dioxide and methane, and zeolite mainly adsorbs carbon monoxide and nitrogen.

The operation temperature was 25° C., the adsorption pressure was 9.0 kgf/cm$^2$G (gage pressure). The amount of high purity hydrogen taken out was adjusted using the aperture of the pressure control valve.

The switching of the adsorption columns was conducted with Step 1 of Table 7 set at 30 seconds, Step 2 set at 70 seconds, and Step 3 set at 200 seconds.

The purity of the hydrogen gas was expressed by the balance remaining after subtracting the components other than hydrogen measured using gas chromatography. Nitrogen was measured by means of thermal conductivity detector gas chromatography (Type G2800T, Yanagimoto Mfg.

Co., Ltd., this is the same in the following Examples), and carbon dioxide, carbon monoxide, and B methane were measured by means of hydrogen flame ionization detector gas chromatography. Gas flow was measured by means of a mass flow controller.

The results were as follows.

When 43.0 NL/min of starting material reformed gas was treated, and the hydrogen purity was 99.999% by volume;

for the activated carbon of the present invention, the amount generated was 23.1 NL/min, and the yield was 72.2%; and for the commercially available activated carbon, the amount generated was 21.5 NL/min, and the yield was 67.1%.

From these results, when using the activated carbon of the present invention, the amount of hydrogen generated was 1.07 times (a 7% increase), and the yield increased 5.1 points.

EXAMPLE 17

Manufacturing Hydrogen from Coke Oven Gas

The separation efficiency of the activated carbon of the present invention was tested by generating hydrogen of high purity by removing methane, carbon dioxide, and other components using the three column pressure swing adsorption device, shown in FIG. 8, using coke oven gas as a starting material.

Since coke oven gas contains, in minute components, aromatic compounds, such as benzene; sulfur compounds, such as hydrogen sulfide; ammonia; and tar mist, it was refined by removing these minute components by passing it through an adsorber which had been charged with activated carbon. The composition of the refined coke oven gas was hydrogen ($H_2$) 60.3% by volume, nitrogen ($N_2$) 3.7% by volume, oxygen ($O_2$) 0.3% by volume, carbon monoxide (CO) 5.3% by volume, carbon dioxide ($CO_2$) 2.3% by volume, methane ($CH_4$) 25.9% by volume, ethane ($C_2H_6$) 0.5% by volume, and ethylene ($C_2H_4$) 1.7% by volume.

The column had an interior diameter of 54.9 mm, a length of 2000 mm, and an internal capacity of 4.73 L. In order, from the bottom, the column was charged with activated carbon of the present invention (A-70) for a length of 700 mm, and zeolite (Type 5A, Union Showa) for a length of 1300 mm. The coke oven gas starting material was supplied from the bottom of the column.

As a comparative example, commercially activated carbon (BPL, Calgon Carbon Corporation) was used, and the zeolite was the same as above. In addition, the lengths charged were the same as above.

In the main, activated carbon adsorbs carbon dioxide and hydrocarbons, and zeolite adsorbs carbon monoxide, nitrogen, and oxygen.

The operation temperature was 25° C., the adsorption pressure was 8.0 kgf/cm²G (gage pressure). The amount of high purity hydrogen taken out was adjusted using the aperture of the pressure control valve.

The switching of the adsorption columns was 10 seconds for Step 1, 20 seconds for Step 2, and 210 seconds for Step 3 of Table 7.

The purity of the hydrogen gas was expressed by the balance remaining after subtracting the components other than hydrogen measured using gas chromatography. Nitrogen and oxygen were measured by means of thermal conductivity detector gas chromatography, and carbon dioxide, carbon monoxide, methane, ethane, and ethylene were measured by means of hydrogen flame ionization detector gas chromatography. Gas flow was measured by means of a mass flow controller.

The results were as follows.

16.7 NL/min of starting material gas was treated:

when the hydrogen purity was 99.999% by volume;

for the activated carbon of the present invention, the amount generated was 6.30 NL/min, and the yield was 62.6%; and for the commercially available activated carbon, the amount generated was 5.88 EL/min, and the yield was 58.4%.

when the hydrogen purity was 99.99% by volume;

for the activated carbon of the present invention, the amount generated was 7.14 NL/min, and the yield was 70.9%; and for the commercially available activated carbon, the amount generated was 6.64 NL/min, and the yield was 65.9%.

From these results, when using the activated carbon of the present invention, the amount of hydrogen generated was 1.07~1.08 times (a 7~8% increase), and the yield increased 4.2~5.0 points.

Industrial Applicability

As explained above, the manufacturing method for the molecular sieving carbon of the present invention can remarkably improve the amount of oxygen adsorbed, and also improve the separation coefficient by means of successively conducting a halogenation treatment, a dehalogenation treatment, and a pore adjustment treatment on a carbonized charcoal obtained by usual methods. Consequently, by using this as an adsorbent for the separation of nitrogen, it is possible to increase the amount of nitrogen generated per unit of adsorbent, raise the nitrogen yield, and reduce the manufacturing cost for nitrogen.

It is possible to reduce the adsorption column capacity by 26% or greater, and to simultaneously reduce the amount of air by 10% or greater when the purity of the nitrogen product is 99.9%.

In addition, the manufacturing method of the activated carbon of the present invention can remarkably improve the amount of carbon dioxide and methane adsorbed by means of successively conducting a halogenation treatment, a dehalogenation treatment, and an activation treatment on a carbonized charcoal obtained by usual methods. Consequently, it can be suitably employed as an adsorbent for separating carbon dioxide and methane from a gas mixture which contains carbon dioxide and methane.

We claim:

1. A manufacturing method for a carbon adsorbent comprising a halogenation treatment step in which a halogenated carbonized charcoal is obtained by bringing carbonized charcoal into contact with halogen gas;

a dehalogenation treatment step in which a porous carbonaceous material is obtained by conducting a heat treatment at a temperature of 600–1300° C. under vacuum evacuation or in an inert gas and a heat treatment at a temperature of 600–850° C. in a hydrogen compound gas or in a hydrogen compound gas which has been diluted with an inert gas, on said halogenated carbonized charcoal to eliminate a part or all of said halogen; and a pore adjustment treatment step in which said porous carbonaceous material is brought into contact with thermally decomposable hydrocarbon.

2. A manufacturing method for a carbon adsorbent according to claim 1, wherein said halogen gas includes at least one halogen selected from the group consisting of chlorine and bromine.

3. A manufacturing method for a carbon adsorbent according to claim 1, wherein said halogenation treatment is a heat treatment at a temperature of 350~1000° C. in a halogen gas diluted with inert gas.

4. A manufacturing method for a carbon adsorbent according to claim 1, wherein said dehalogenation treatment comprises a heat treatment at a temperature of 600~1300° C. in an inert gas, and a heat treatment at a temperature of 600~850° C. in a hydrogen compound gas which has been diluted with an inert gas.

5. A manufacturing method for a carbon adsorbent according to claim 4, wherein said hydrogen compound gas includes at least one compound selected from the group consisting of water and $C_1$–$C_4$ alkane and $C_{2-4}$ alkene.

6. A manufacturing method for a carbon adsorbent according to claim 1, wherein said carbonized charcoal is at least one carbonized carbon compound selected from the group consisting of coconut shell char and phenol resin.

7. A manufacturing method for a carbon adsorbent according to claim 1, wherein said pore adjustment treatment being a heat treatment at a temperature of 600~850° C. in a thermally decomposable hydrocarbon diluted with an inert gas.

8. A manufacturing method for a carbon adsorbent according to claim 7, wherein said thermally decomposable hydrocarbon includes at least one compound selected from the group consisting of benzene and toluene.

9. A carbon adsorbent obtained by the manufacturing method of claim 1, said carbon adsorbent being adsorbing oxygen in an amount of 9–14 cc/g, and having a coefficient of adsorption of oxygen with respect to nitrogen of 40–80 at 25° C. and 1 atm.

10. A method for separating nitrogen gas from air, which comprises separating nitrogen from air with a carbon adsorbent according to claim 9, by means of pressure swing adsorption.

11. A gas adsorption device comprising an adsorption column provided with a gas supply part which is connected to a supply means for a mixed gas starting material, and an exhaust part for guiding unadsorbed gas;

said adsorption column being charged with an adsorbent which adsorption separates a part of a component gas of a gas mixture starting material;

wherein said adsorbent is a carbon adsorbent according to claim 9.

12. A manufacturing method for a carbon adsorbent comprising a halogenation treatment step in which a halogenated carbonized charcoal is obtained by bringing carbonized charcoal into contact with halogen gas;

a dehalogenation treatment step in which a porous carbonaceous material is obtained by conducting a heat treatment at a temperature of 600–1300° C. under vacuum evacuation or in an inert gas and a heat treatment at a temperature of 600–850° C. in a hydrogen compound gas or in a hydrogen compound gas which has been diluted with an inert gas, on said halogenated carbonized charcoal to eliminate a part or all of said halogen; and an activation treatment step in which said porous carbonaceous material is activated.

13. A manufacturing method for a carbon adsorbent according to claim 12, wherein said halogen gas includes at least one halogen selected from the group consisting of chlorine and bromine.

14. A manufacturing method for a carbon adsorbent according to claim 12, wherein said halogenation treatment is a heat treatment at a temperature of 350~1000° C. in a halogen gas diluted with inert gas.

15. A manufacturing method for a carbon adsorbent according to claim 12, wherein said dehalogenation treatment comprises a heat treatment at a temperature of 600~1300° C. in an inert gas, and a heat treatment at a temperature of 600~850° C. in a hydrogen compound gas which has been diluted with an inert gas.

16. A manufacturing method for a carbon adsorbent according to claim 15, wherein said hydrogen compound gas includes at least one compound selected from the group consisting of water and $C_1$–$C_1$ alkane and $C_{2-4}$ alkene.

17. A manufacturing method for a carbon adsorbent according to claim 12, wherein said carbonized charcoal is at least one carbonized carbon compound selected from the group consisting of coconut shell char and phenol resin.

18. A manufacturing method for a carbon adsorbent according to claim 12, wherein said activation treatment being a heat treatment at 650~1150° C. in an oxidizing gas diluted with an inert gas.

19. A gas adsorption separation method comprising a step of supplying a gas mixture starting material to an adsorption column charged with a carbon adsorbent according to claim 9; and a step of adsorption separation of a component gas of said gas mixture starting material by means of said adsorbent.

20. A gas adsorption separation method according to claim 19, wherein said gas mixture starting material is a gas mixture which contains at least one component gas selected from the group consisting of carbon dioxide and methane; and in said step of adsorption separation of said component gas, said component gas is adsorption separated by means of a pressure swing adsorption method.

21. A carbon adsorbent obtained by the manufacturing method of claim 12, characterized by adsorbing methane in an amount of 30–45 cc/g at 25° C. and at 1 atm.

22. A carbon adsorbent according to claim 21 having a specific surface area of 400~2000 m²/g, and a pore volume of 0.1~0.7 cm³/g.

23. A gas adsorption separation method, comprising:

supplying a gas mixture starting material to an adsorption column charged with a carbon adsorbent according to claim 21; and adsorption separating a component gas of said gas mixture starting material by means of said adsorbent.

24. A gas adsorption device, comprising:

an adsorption column provided with a gas supply part which is connected to a supply means for a mixed gas starting material, and an exhaust part for guiding unadsorbed gas;

said adsorption column being charged with an adsorbent which absorption separates a part of a component gas of a gas mixture starting material;

wherein said adsorbent is a carbon absorbent according to claim 21.

* * * * *

UNITED STATES PATENT AND TRADEMARK OFFICE
CERTIFICATE OF CORRECTION

PATENT NO. : 5,972,834

DATED : October 26, 1999

INVENTOR(S): Takushi OHSAKI, et al.

It is certified that an error appears in the above-identified patent and that said Letters Patent is hereby corrected as shown below:

On the title page, item [30] should read:

-- [30]--  Foreign Application Priority Data

Apr. 27, 1995   [JP]   Japan .......................................... 7-104442
    Mar. 5, 1996   [JP]   Japan .......................................... 8-47813

Signed and Sealed this

Nineteenth Day of December, 2000

Attest:

Q. TODD DICKINSON

Attesting Officer

Commissioner of Patents and Trademarks